US010389500B2

(12) United States Patent
Patel et al.

(10) Patent No.: US 10,389,500 B2
(45) Date of Patent: Aug. 20, 2019

(54) DEMODULATION REFERENCE SIGNAL CONFIGURATION IN A MULTI-INPUT MULTI-OUTPUT WIRELESS COMMUNICATION SYSTEM

(71) Applicant: QUALCOMM Incorporated, San Diego, CA (US)

(72) Inventors: Shimman Patel, San Diego, CA (US); Wanshi Chen, San Diego, CA (US); Juan Montojo, San Diego, CA (US); Peter Gaal, San Diego, CA (US); Seyedkianoush Hosseini, San Diego, CA (US); Aleksandar Damnjanovic, Del Mar, CA (US); Hao Xu, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 127 days.

(21) Appl. No.: 15/410,057

(22) Filed: Jan. 19, 2017

(65) Prior Publication Data
US 2017/0264408 A1     Sep. 14, 2017

Related U.S. Application Data

(60) Provisional application No. 62/307,252, filed on Mar. 11, 2016.

(51) Int. Cl.
*H04L 5/00*       (2006.01)
*H04B 7/0413*    (2017.01)
*H04W 72/04*     (2009.01)

(52) U.S. Cl.
CPC ........ *H04L 5/0048* (2013.01); *H04B 7/0413* (2013.01); *H04L 5/0037* (2013.01); *H04L 5/0051* (2013.01); *H04L 5/0053* (2013.01); *H04W 72/0446* (2013.01)

(58) Field of Classification Search
CPC . H04L 5/0048; H04B 7/0413; H04W 72/0446
See application file for complete search history.

(56) References Cited

U.S. PATENT DOCUMENTS

2014/0036850 A1\*   2/2014   Akimoto ............... H04L 5/0017
                                                                                                                    370/329

OTHER PUBLICATIONS

LG Electronics: "Discussion on PUSCH transmission with TTI shortening", vol. RAN WG1, no. St. Julian's, Malta; Feb. 15, 2016-Feb. 19, 2016 Feb. 14, 2016 (Feb. 14, 2016).\*

(Continued)

*Primary Examiner* — Yemane Mesfin
*Assistant Examiner* — Henry Baron
(74) *Attorney, Agent, or Firm* — Anthony R. Morris

(57) ABSTRACT

The present methods and apparatus enable transmission of an interlaced reference signal for two UEs using a comb structure. In some aspects, the present methods and apparatus may allocate resources and indicate whether a first UE and a second UE are to transmit DM-RS with a comb structure in a single slot based on the allocation. Further, in some aspects, the present methods and apparatus may allocate resources and transmit information indicating whether a first UE is to transmit DM-RS in a first slot or in both a first slot and a second slot within a subframe.

26 Claims, 16 Drawing Sheets

(56) References Cited

OTHER PUBLICATIONS

Ericsson: "Physical Layer Aspects of Short TTI for Uplink Transmissions" 3GPP Draft, [LATRED] R1-160939_UL_PHY, 3rd Generation Partnership Project-(3GPP), Mobile Competence Centre, 650 Route Des Lucioles, F-06921 Sophia-Antipolis Cedex, France vol. RAN WG1 no. Malta, Feb. 15, 2016-Feb. 19, 2016, Feb. 14, 2016 (Feb. 14, 2016), XP051053553, Retrieved from the Internet: URL: http://www.3gpp.org/ftp/Meetings_3GPP_SYNC/RAN1/Docs/.
Huawei., et al., "Overview of short TTI" 3GPP Draft, R1-160291, 3rd Generation Partnership Project (3GPP), Mobile Competence Centre, 650 Route Des Lucioles, F-06921 Sophia-Antipolis Cedex, France, vol. RAN WG1 no. St Julian's Malta, Feb. 15, 2016-Feb. 19, 2016, Feb. 14, 2016 (Feb. 14, 2016), XP051053631, Retrieved from the Internet: URL: http://www.3gpp.org/ftp/Meetings_3GPP_SYNC/RAN1/Docs/.
International Search Report and Written Opinion—PCT/US2017/014404—ISA/EPO—dated Mar. 17, 2017.
LG Electronics: "Discussion on PUSCH Transmission with TTI shortening" 3GPP Draft, R1-160655, 3rd Generation Partnership Project (3GPP), Mobile Competence Centre, 650 Route Des Lucioles, F-06921 Sophia-Antipolis Cedex, France vol. RAN WG1 no. St. Julian's Malta, Feb. 15, 2016-Feb. 15, 2016, Feb. 14, 2016 (Feb. 14, 2016), XP051053984, Retrieved from the Internet: URL:http://www.3gpp.org/ftp/Meetings_3GPP_SYNC/RAN1/Docs/.

\* cited by examiner

DEMODULATION REFERENCE SIGNAL CONFIGURATION IN A MULTI-INPUT MULTI-OUTPUT WIRELESS COMMUNICATION SYSTEM

CROSS-REFERENCE TO RELATED APPLICATION(S)

This application claims the benefit of U.S. Provisional Application Ser. No. 62/307,252, entitled "DEMODULATION REFERENCE SIGNAL CONFIGURATION IN A MULTI-INPUT MULTI-OUTPUT WIRELESS COMMUNICATION SYSTEM" and filed on Mar. 11, 2016, which is expressly incorporated by reference herein in its entirety.

BACKGROUND

The present disclosure relates generally to communication systems, and more particularly, to demodulation reference signal (DM-RS) configuration in a multi-input multi-output (MIMO) wireless communications system.

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is Long Term Evolution (LTE). LTE is a set of enhancements to the Universal Mobile Telecommunications System (UMTS) mobile standard promulgated by Third Generation Partnership Project (3GPP). LTE is designed to support mobile broadband access through improved spectral efficiency, lowered costs, and improved services using OFDMA on the downlink, SC-FDMA on the uplink, and MIMO antenna technology. However, as the demand for mobile broadband access continues to increase, there exists a need for further improvements in LTE technology. These improvements may also be applicable to other multi-access technologies and the telecommunication standards that employ these technologies.

In wireless communication systems, a plurality of user equipments (UEs) served by a particular eNodeB may receive configuration data from the eNodeB for configuration of uplink communication. For example, the eNodeB may assign resources to multiple UEs to support MIMO communication and transmission of reference signals by each UE. However, a UE in MIMO communication may not be able to communicate reference signals useful for channel estimation and decoding of uplink data by the eNodeB if such reference signals (e.g., legacy reference signals) are communicated in only one symbol of a transmit time interval (TTI) of the UE. As such, improvements in the communication of reference signals by one or more UEs in a wireless communications system are desired.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In accordance with an aspect, methods, apparatus, and computer-readable media relate to wireless communication at a base station. The described aspects include allocating a first set of uplink resources for MIMO communication to a first UE and a second set of uplink resources for MIMO communication to a second UE, the first set of uplink resources and the second set of uplink resources being in one slot corresponding to a TTI of the first UE and the second UE. The described aspects further include transmitting information indicating whether the first UE and the second UE are to transmit DM-RS with a comb structure in the one slot based on the allocation.

In accordance with an aspect, methods, apparatus, and computer-readable media relate to wireless communication at a first UE. The described aspects include receiving information indicating whether the first UE is to transmit a DM-RS with a comb structure in an allocated first set of uplink resources for MIMO communication, the first set of uplink resources being in one slot corresponding to a TTI of the first UE. The described aspects further include transmitting the DM-RS based on the received information.

In accordance with an aspect, methods, apparatus, and computer-readable media relate to wireless communication at a base station. The described aspects include allocating a first set of uplink resources for MIMO communication and a second set of uplink resources for MIMO communication to a first UE, the first set of uplink resources being in a first slot corresponding to a first TTI, the second set of uplink resources being in a second slot, the first slot and second slot being different slots within a single subframe. The described aspects further include allocating a third set of uplink resources for MIMO communication to a second UE, the third set of uplink resources being in the first slot and the second slot within the subframe corresponding to a second TTI, the first and second TTIs being different. The described aspects further include transmitting to the first UE, information indicating whether to transmit in the second slot a same DMRS as the first slot or to transmit in the second slot a negative of the DMRS used in the first slot.

In accordance with an aspect, methods, apparatus, and computer-readable media relate to wireless communication at a first UE. The described aspects include receiving information indicating whether the first UE is to transmit a DM-RS in a single slot or in two slots within a subframe, the single slot corresponding to a TTI of the first UE and being associated with an allocated first set of uplink resources for MIMO communication. The described aspects further include transmitting the DM-RS in either the single slot or in the two slots based on the received information.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

The accompanying drawings are presented to aid in the description of various aspects of the disclosure and are provided solely for illustration of the aspects and not limitation thereof. The drawings include like reference numbers for like elements, and may represent optional components or actions using dashed lines.

DETAILED DESCRIPTION

Figure 1:
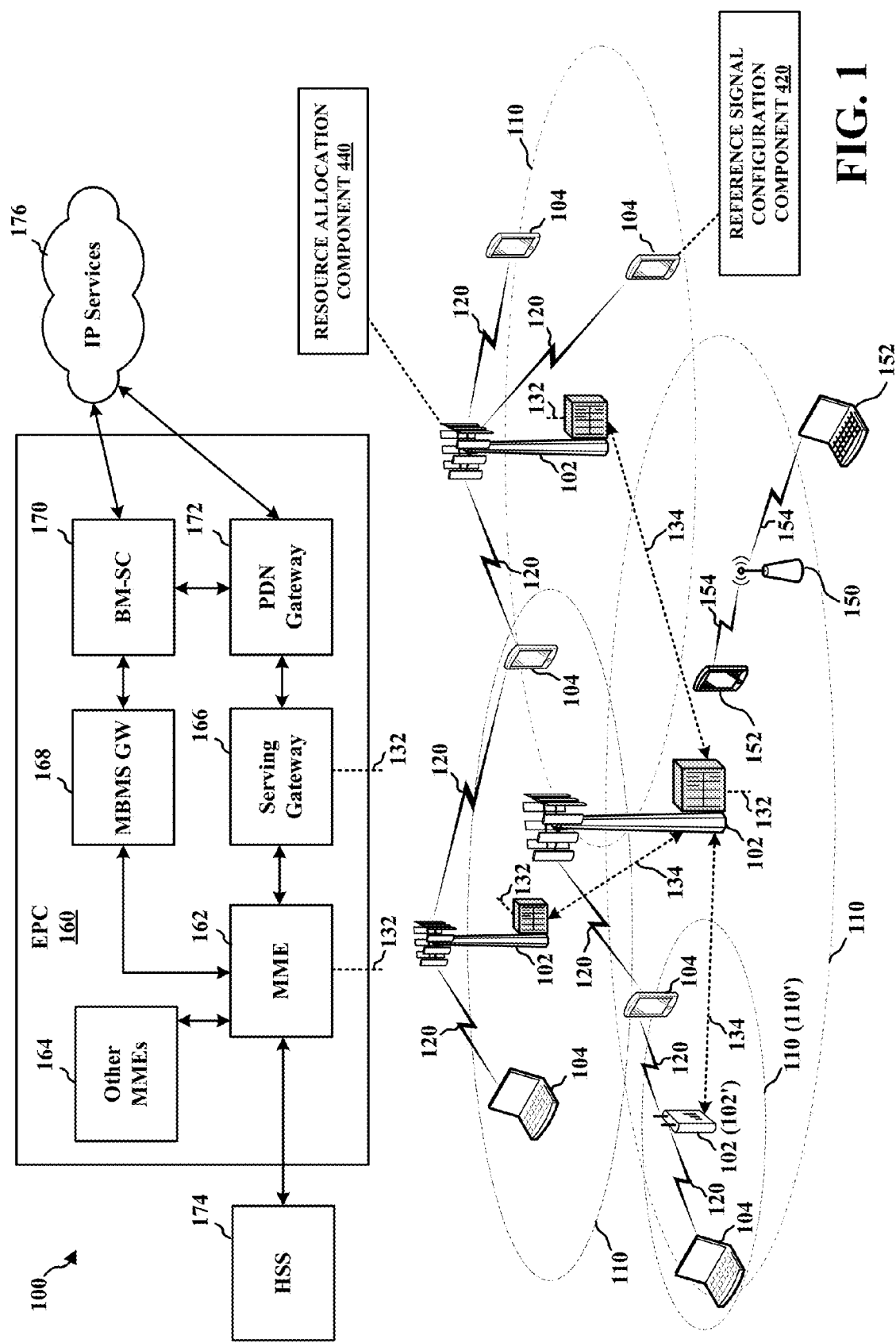
FIG. 1 is a diagram illustrating an example of a wireless communications system and an access network including a UE having an aspect of a resource allocation component at a base station and a reference signal configuration component at a UE as described herein and in accordance with various aspects of the present disclosure.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example aspects, the functions described may be implemented in hardware, software, or any combination thereof. If implemented in software, the functions may be stored on or encoded as one or more instructions or code on a computer-readable medium. Computer-readable media includes computer storage media.

Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

FIG. 1 is a diagram illustrating an example of a wireless communications system and an access network 100 including at least one UE 104 configured to include reference signal configuration component 420 for configuring transmission of DM-RS based on information received from a base station, and in accordance with various aspects of the present disclosure. The wireless communications system 100 (also referred to as a wireless wide area network (WWAN)) includes base stations 102, UEs 104, and an Evolved Packet Core (EPC) 160. The base stations 102, each of which may include resource allocation component 440 for allocating resources to each UE and transmitting information indicating whether the a UE is to transmit DM-RS in a single slot TTI having a comb structure or dual slot TTI, and in accordance with various aspects of the present disclosure. Further, the base stations 102 may include macro cells (high power cellular base station) and/or small cells (low power cellular base station). The macro cells include eNBs. The small cells include femtocells, picocells, and microcells.

The base stations 102 (collectively referred to as Evolved Universal Mobile Telecommunications System (UMTS) Terrestrial Radio Access Network (E-UTRAN)) interface with the EPC 160 through backhaul links 132 (e.g., S1 interface). In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160) with each other over backhaul links 134 (e.g., X2 interface). The backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macro cells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use MIMO antenna technology, including spatial multiplexing, beamforming, and/or transmit diversity. The communication links may be through one or more carriers. The base stations 102/UEs 104 may use spectrum up to Y MHz (e.g., 5, 10, 15, 20 MHz) bandwidth per carrier allocated in a carrier aggregation of up to a total of Yx MHz (x component carriers) used for transmission in each direction. Allocation of carriers may be asymmetric with respect to DL and UL (e.g., more or less carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

The wireless communications system 100 may further include a Wi-Fi access point (AP) 150 in communication with Wi-Fi stations (STAs) 152 via communication links 154 in a 5 GHz unlicensed frequency spectrum. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ LTE and use the same 5 GHz unlicensed frequency spectrum as used by the Wi-Fi AP 150. The small cell 102', employing LTE in an unlicensed frequency spectrum, may boost coverage to and/or increase capacity of the access network. LTE in an unlicensed spectrum may be referred to as LTE-unlicensed (LTE-U), licensed assisted access (LAA), or MuLTEfire.

The EPC 160 may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service (PSS), and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The base station may also be referred to as a Node B, an access point, a base transceiver station, a radio base station, a radio transceiver, a transceiver function, a basic service set (BSS), an extended service set (ESS), or some other suitable terminology. The eNB 102 provides an access point to the EPC 160 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, or any other similar functioning device. The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

Figure 2:
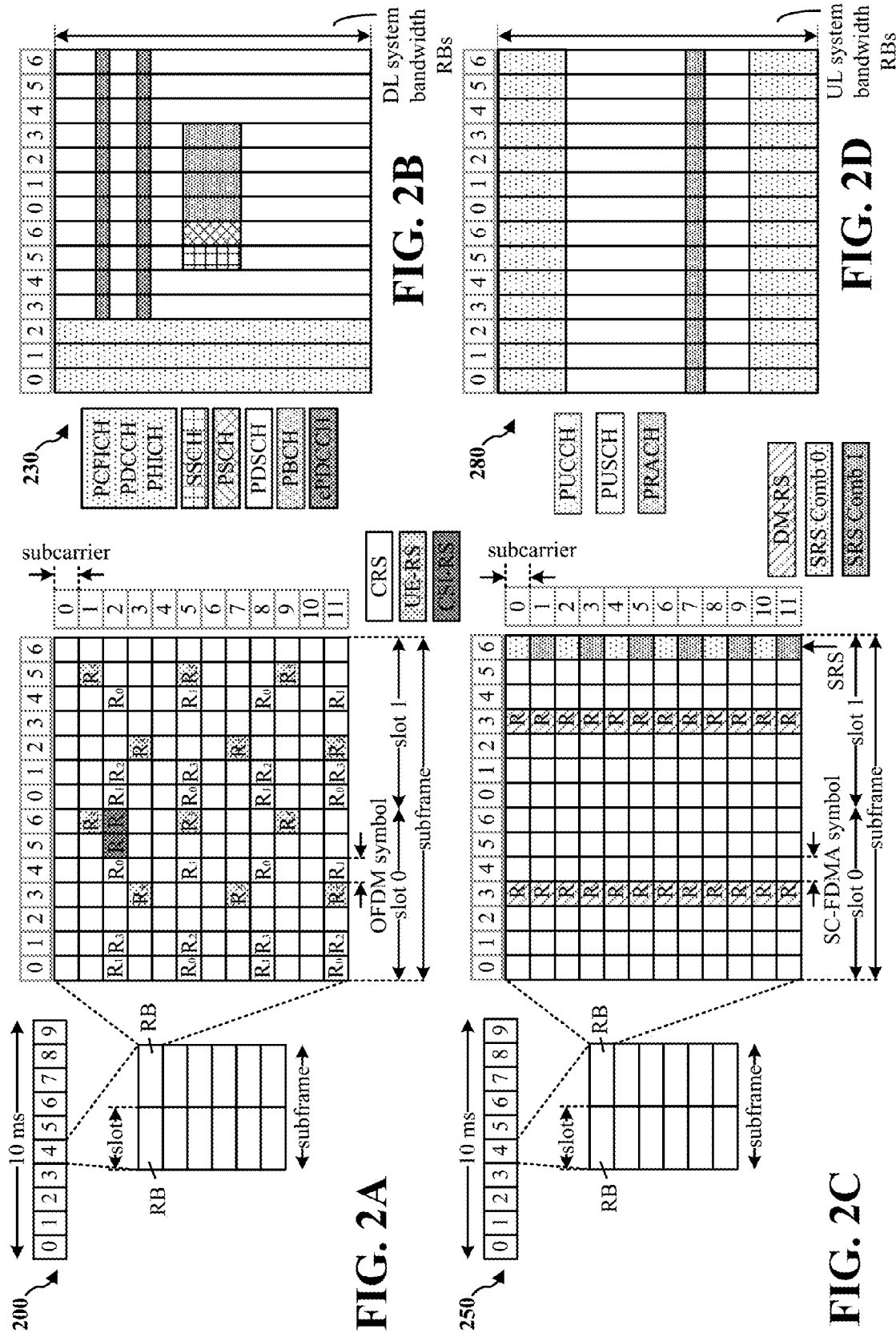
FIGS. 2A, 2B, 2C, and 2D are diagrams illustrating LTE examples of a DL frame structure, DL channels within the DL frame structure, an UL frame structure, and UL channels within the UL frame structure, respectively.

FIG. 2A is a diagram 200 illustrating an example of a DL frame structure in LTE, which may be an example of a frame structure that may be received by at least one UE 104 including reference signal configuration component 420 in accordance with various aspects of the present disclosure. FIG. 2B is a diagram 230 illustrating an example of channels within the DL frame structure in LTE that may be used by UE 104 as described herein. FIG. 2C is a diagram 250 illustrating an example of an UL frame structure in LTE that may be used by UE 104. FIG. 2D is a diagram 280 illustrating an example of channels within the UL frame structure in LTE that may be used by UE 104 including reference signal configuration component 420 to transmit data to base station 102 including resource allocation component 440 in accordance with various aspects of the present disclosure. Other wireless communication technologies may have a different frame structure and/or different channels. In LTE, a frame (10 ms) may be divided into 10 equally sized subframes. Each subframe may include two consecutive time slots. A resource grid may be used to represent the two time slots, each time slot including one or more time concurrent resource blocks (RBs) (also referred to as physical RBs (PRBs)). The resource grid is divided into multiple resource elements (REs). In LTE, for a normal cyclic prefix, an RB contains 12 consecutive subcarriers in the frequency domain and 7 consecutive symbols (for DL, OFDM symbols; for UL, SC-FDMA symbols) in the time domain, for a total of 84 REs. For an extended cyclic prefix, an RB contains 12 consecutive subcarriers in the frequency domain and 6 consecutive symbols in the time domain, for a total of 72 REs. The number of bits carried by each RE depends on the modulation scheme.

As illustrated in FIG. 2A, some of the REs carry DL reference (pilot) signals (DL-RS) for channel estimation at the UE. The DL-RS may include cell-specific reference signals (CRS) (also sometimes called common RS), UE-specific reference signals (UE-RS), and channel state information reference signals (CSI-RS). FIG. 2A illustrates CRS for antenna ports 0, 1, 2, and 3 (indicated as $R_0$, $R_1$, $R_2$, and $R_3$, respectively), UE-RS for antenna port 5 (indicated as $R_5$), and CSI-RS for antenna port 15 (indicated as R). FIG. 2B illustrates an example of various channels within a DL subframe of a frame. The physical control format indicator channel (PCFICH) is within symbol 0 of slot 0, and carries a control format indicator (CFI) that indicates whether the physical downlink control channel (PDCCH) occupies 1, 2, or 3 symbols (FIG. 2B illustrates a PDCCH that occupies 3 symbols). The PDCCH carries downlink control information (DCI) within one or more control channel elements (CCEs), each CCE including nine RE groups (REGs), each REG including four consecutive REs in an OFDM symbol. A UE may be configured with a UE-specific enhanced PDCCH (ePDCCH) that also carries DCI. The ePDCCH may have 2, 4, or 8 RB pairs (FIG. 2B shows two RB pairs, each subset including one RB pair). The physical hybrid automatic repeat request (ARQ) (HARQ) indicator channel (PHICH) is also within symbol 0 of slot 0 and carries the HARQ indicator (HI) that indicates HARQ acknowledgement (ACK)/negative ACK (NACK) feedback based on the physical uplink shared channel (PUSCH). The primary synchronization channel (PSCH) is within symbol 6 of slot 0 within subframes 0 and 5 of a frame, and carries a primary synchronization signal (PSS) that is used by a UE to determine subframe timing and a physical layer identity. The secondary synchronization channel (SSCH) is within symbol 5 of slot 0 within subframes 0 and 5 of a frame, and carries a secondary synchronization signal (SSS) that is used by a UE to determine a physical layer cell identity group number. Based on the physical layer identity and the physical layer cell identity group number, the UE can determine a physical cell identifier (PCI). Based on the PCI, the UE can determine the locations of the aforementioned DL-RS. The physical broadcast channel (PBCH) is within symbols 0, 1, 2, 3 of slot 1 of subframe 0 of a frame, and carries a master information block (MIB). The MIB provides a number of RBs in the DL system bandwidth, a PHICH configuration, and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DM-RS for channel estimation at the eNB, the transmission of which may be configured at or by base station 102 including resource allocation component 440 and UE 104 including reference signal configuration component 420. The UE may additionally transmit sounding reference signals (SRS) in the last symbol of a subframe. The SRS may have a comb structure, and a UE may transmit SRS on one of the combs. The SRS may be used by an eNB for channel quality estimation to enable frequency-dependent scheduling on the UL. FIG. 2D illustrates an example of various channels within an UL subframe of a frame. A physical random access channel (PRACH) may be within one or more subframes within a frame based on the PRACH configuration. The PRACH may include six consecutive RB pairs within a subframe. The PRACH allows the UE to perform initial system access and achieve UL synchronization. A physical uplink control channel (PUCCH) may be located on edges of the UL system bandwidth. The PUCCH carries uplink control information (UCI), such as scheduling requests, a channel quality indicator (CQI), a precoding matrix indicator (PMI), a rank indicator (RI), and HARQ ACK/NACK feedback. The PUSCH carries data, and may additionally be used to carry a buffer status report (BSR), a power headroom report (PHR), and/or UCI.

Figure 3:
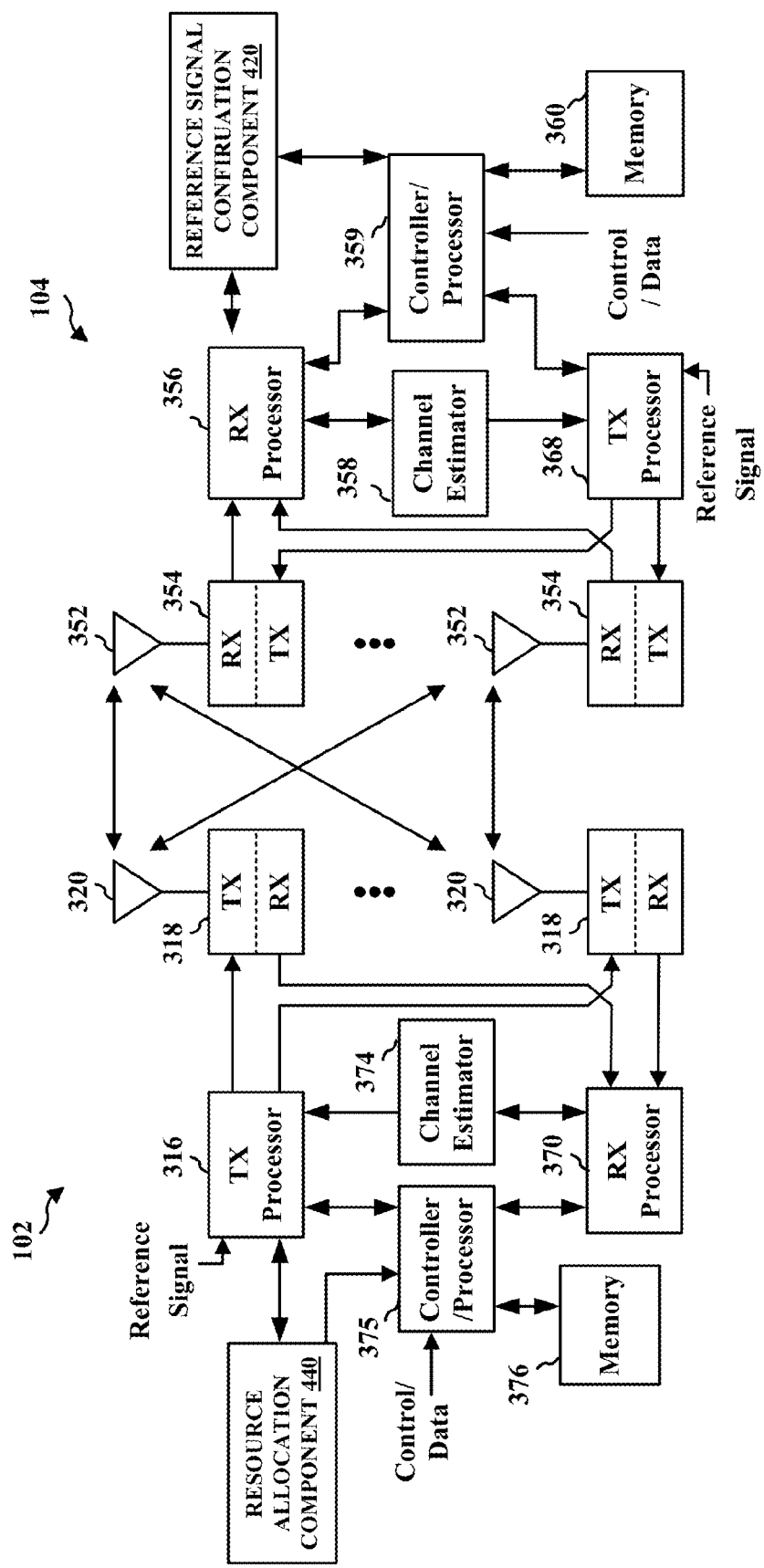
FIG. 3 is a diagram illustrating an example of an eNodeB and UE in an access network, where the UE includes an aspect of a reference signal configuration component and the eNodeB includes an aspect of a resource allocation component as described herein and in accordance with various aspects of the present disclosure.

FIG. 3 is a block diagram of a base station 102 (e.g., eNB) in communication with UE 104 in an access network. In an aspect, UE 104 may be configured to include reference signal configuration component 420. In an aspect, reference signal configuration component 420 may configure transmission of DM-RS based on information received from base station 102. In the DL, IP packets from the EPC 160 may be provided to a controller/processor 375. The controller/processor 375 implements layer 3 and layer 2 functionality. Layer 3 includes a radio resource control (RRC) layer, and layer 2 includes a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demuliplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 104. Each spatial stream may then be provided to a different antenna 320 via a separate transmitter 318TX. Each transmitter 318TX may modulate an RF carrier with a respective spatial stream for transmission.

At the UE 104, each receiver 354RX receives a signal through its respective antenna 352. Each receiver 354RX recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 104. If multiple spatial streams are destined for the UE 104, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by base station 102 including resource allocation component 440, which may be configured to allocate resources to each UE (e.g., including UE 104) and transmit information indicating whether the a UE is to transmit DM-RS in a single slot TTI having a comb structure or dual slot TTI. These soft decisions may be based on channel estimates computed by the channel estimator 358. The soft decisions are then decoded and deinterleaved to recover the data and control signals that were originally transmitted by the base station 102 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets from the EPC 160. The controller/processor 359 is also responsible for error detection using an ACK and/or NACK protocol to support HARQ operations.

Similar to the functionality described in connection with the DL transmission by the base station 102, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demuliplexing of MAC SDUs from TBs, scheduling information reporting, error correction through HARQ, priority handling, and logical channel prioritization.

Channel estimates derived by a channel estimator 358 from a reference signal or feedback transmitted by the base station 102 may be used by the TX processor 368 to select the appropriate coding and modulation schemes, and to facilitate spatial processing. The spatial streams generated by the TX processor 368 may be provided to different antenna 352 via separate transmitters 354TX. Each transmitter 354TX may modulate an RF carrier with a respective spatial stream for transmission.

The UL transmission is processed at the base station 102 in a manner similar to that described in connection with the receiver function at the UE 104. Each receiver 318RX receives a signal through its respective antenna 320. Each receiver 318RX recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets from the UE 104. IP packets from the controller/processor 375 may be provided to the EPC 160. The controller/processor 375 is also responsible for error detection using an ACK and/or NACK protocol to support HARQ operations.

Figure 4:
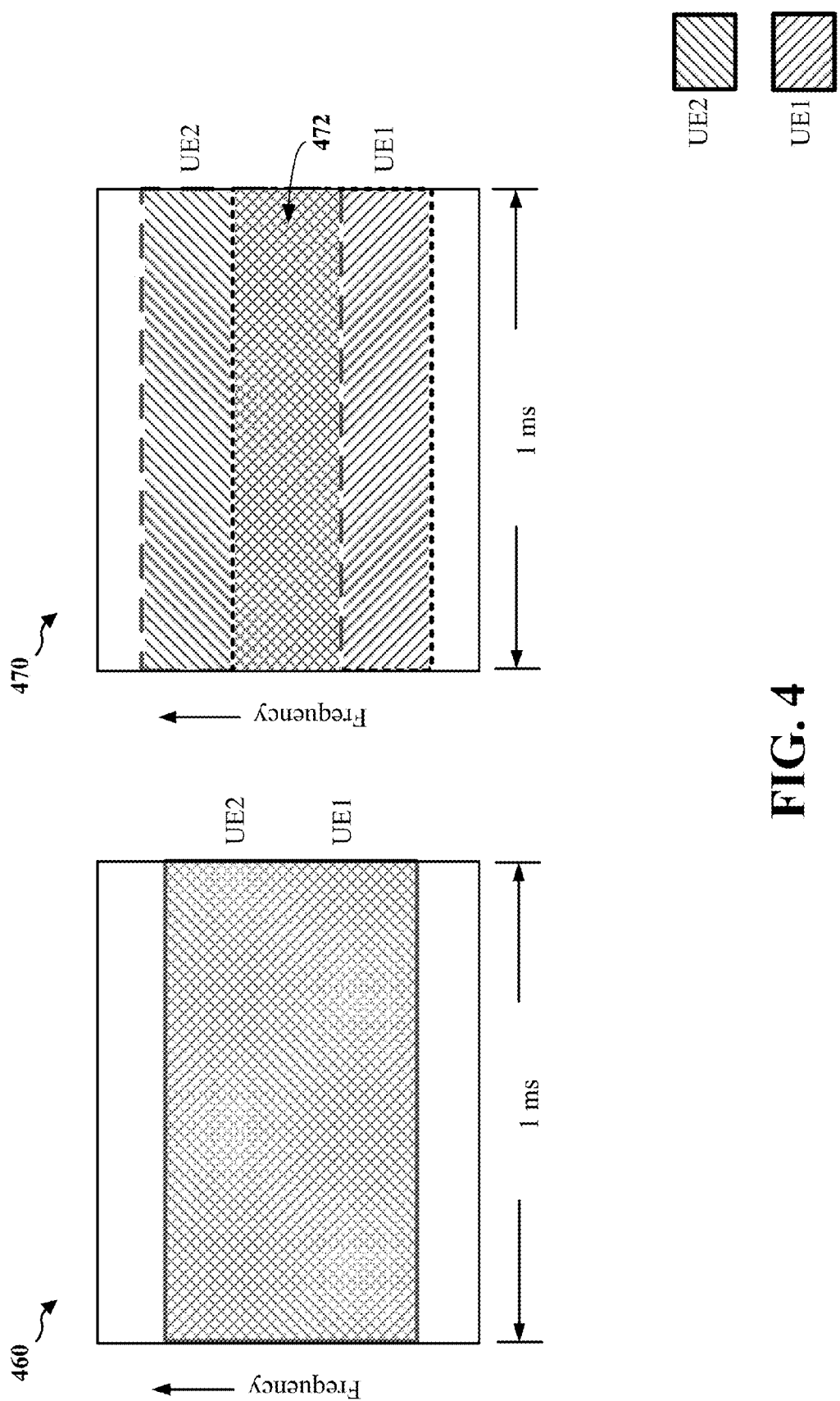
FIG. 4 is a diagram illustrating aspects of a MIMO configuration in accordance with various aspects of the present disclosure.

FIG. 4 is a diagram illustrating aspects of various MIMO configurations in accordance with various aspects of the present disclosure. In an aspect, configuration 460 may be an uplink multi-user MIMO (MU-MIMO) configuration according to 3GPP TS 36.211. For example, based on channel estimates, an eNodeB may pair UEs to create a virtual MIMO configuration. In such case, the assigned PUSCH resources may be identical. Further, in configuration 460, the eNodeB can select to pair a first UE and a second UE in the same resources assignment to produce a virtual MU-MIMO configuration. Further, configuration 470 may be an MU-MIMO configuration according to 3GPP TS 36.211. Specifically, an eNodeB may assign a first UE and a second UE with a different cyclic shift and/or orthogonal cover code (OCC) pair. For instance, in such configuration, a UE may support uplink single-user MIMO with up to four layers. Additionally, an eNodeB may additionally support MU-MIMO across UEs with flexible reference signal and PUSCH resource allocation including the aspects of partial resource overlap 472. Further, with respect to configuration 470, downlink DM-RS for PUSCH may be configured according to $$r_{PUSCH}^{(\lambda)}(m \cdot M_{sc}^{RS}+n) = w^{(\lambda)}(m) r_{u,v}^{(\alpha_\lambda)}(n)$$

where λ is the layer number $$\lambda \in \{0,1,\ldots,\upsilon-1\}; \upsilon <= 4$$

where w is the OCC across the two DM-RS in each slot, where α is the cyclic shift, and $$\alpha_\lambda = 2\pi n_{cs,\lambda}/12 \text{ with } n_{cs,\lambda} = (n_{DMRS}^{(1)} + n_{DMRS,\lambda}^{(2)} + n_{PN}(n_s)) \bmod 12$$

where the values of $$n_{DMRS}^{(1)}, n_{DMRS,\lambda}^{(2)}, w^{(\lambda)}(m) \text{ are given by:}$$

| Cyclic Shift Field in Uplink PDCCH grant | $n_{DMRS,\lambda}^{(2)}$ | | | | $[w^{(\lambda)}(0) \ w^{(\lambda)}(1)]$ | | | |
|---|---|---|---|---|---|---|---|---|
| | λ = 0 | λ = 1 | λ = 2 | λ = 3 | λ = 0 | λ = 1 | λ = 2 | λ = 3 |
| 000 | 0 | 6 | 3 | 9 | [1 1] | [1 1] | [1 −1] | [1 −1] |
| 001 | 6 | 0 | 9 | 3 | [1 −1] | [1 −1] | [1 1] | [1 1] |
| 010 | 3 | 9 | 6 | 0 | [1 −1] | [1 −1] | [1 1] | [1 1] |
| 011 | 4 | 10 | 7 | 1 | [1 1] | [1 1] | [1 1] | [1 1] |
| 100 | 2 | 8 | 5 | 11 | [1 1] | [1 1] | [1 1] | [1 1] |
| 101 | 8 | 2 | 11 | 5 | [1 −1] | [1 −1] | [1 −1] | [1 −1] |
| 110 | 10 | 4 | 1 | 7 | [1 −1] | [1 −1] | [1 −1] | [1 −1] |
| 111 | 9 | 3 | 0 | 6 | [1 1] | [1 1] | [1 −1] | [1 −1] | where $n_{DMRS}^{(1)}$ is mapping from a cyclic shift value provided by higher layers.

For example, to support MU-MIMO configuration, a first UE and a second UE may be given downlink control information (DCI) format of four grants with overlapping PUSCH resources such that two layers with cyclic shift field values of 000 and 011 may be selected. As such, non-equal cyclic shifts ensure DM-RS orthogonality as long as PUSCH resources for both UEs are identical. For additional flexibility, the UEs may be given partially overlapping PUSCH grants, for example, having two layers with cyclic shift values corresponding to the cyclic shift fields 000 and 001. Further, the OCC across two slots provides orthogonality between the UEs' DM-RS symbols in the event of partial overlap. Even more, orthogonality may be extended to additional UEs (e.g., first UE, second UE, third UE may all be partial overlapping). In such a case, selection of first UE=000, second UE=001, and third UE=010 ensures orthogonality.

The present disclosure relates to reference signal configurations in a MIMO wireless communication system. Specifically, reference signals such as a DM-RS may be transmitted by a UE in the uplink to a base station (e.g., eNB) for channel estimation and demodulation of uplink control information/data, for example, control information/data in PUSCH and PUCCH resources. However, in the event non-orthogonal DM-RS is received by the base station, the base station may be unable to distinguish between DM-RS of one UE and DM-RS of another UE, and therefore the base station may be unable to perform adequate channel estimation for decoding control information and data from the UEs. As such, to facilitate proper transmission of DM-RS, the base station may assign resources and corresponding cyclic shifts and OCCs to multiple UEs to support MIMO communication and transmission of DM-RS by each UE. However, despite the use of cyclic shifts and OCCs by the UEs for DM-RS, the DM-RS may lose its orthogonality between UEs when the TTI duration is shortened for a UE.

That is, for example, legacy UEs may transmit information including DM-RS using a 1 ms TTI, whereas a non-legacy UE may transmit information using a TTI less than 1 ms. In the case of DM-RS transmission by legacy UEs, a subframe having a 1 ms TTI may be used to transmit DM-RS based at least on an OCC spanning the TTI of two slots. However, in the case of non-legacy UEs, and more particularly during MIMO communication including at least two UEs, transmission of DM-RS using a TTI of less than 1 ms using a legacy based transmission structure may break the orthogonality of the transmission. In particular, the OCC used in legacy based DM-RS transmission would no longer be applicable, as the length of the transmission is shortened from the dual slot TTI (e.g., 1 ms) transmission having two symbols for DM-RS to, for example, a single slot TTI transmission having a single symbol used for DM-RS. Hence, in order to preserve orthogonality, and enable effective decoding of DM-RS at the base station, transmission of DM-RS in a MIMO environment by at least two UEs may be accomplished by using a comb structure that maps DM-RS in an even comb for one UE and an odd comb for another UE.

As such, in order to improve channel estimation and demodulation of received DM-RS transmissions, the present methods and apparatus may enable transmission of an interlaced DM-RS for two UEs using a comb structure. Accordingly, in some aspects, the present methods and apparatus may provide an efficient solution, as compared to current solutions, for example, to allocate resources and indicate whether a first UE and a second UE are to transmit DM-RS with a comb structure in a single slot based on the allocation. Further, in some aspects, the present methods and apparatus may provide an efficient solution, as compared to current solutions, for example, to allocate resources and transmit information indicating whether a first UE is to transmit DM-RS in a first slot or in both a first slot and a second slot within a subframe.

Figure 5:
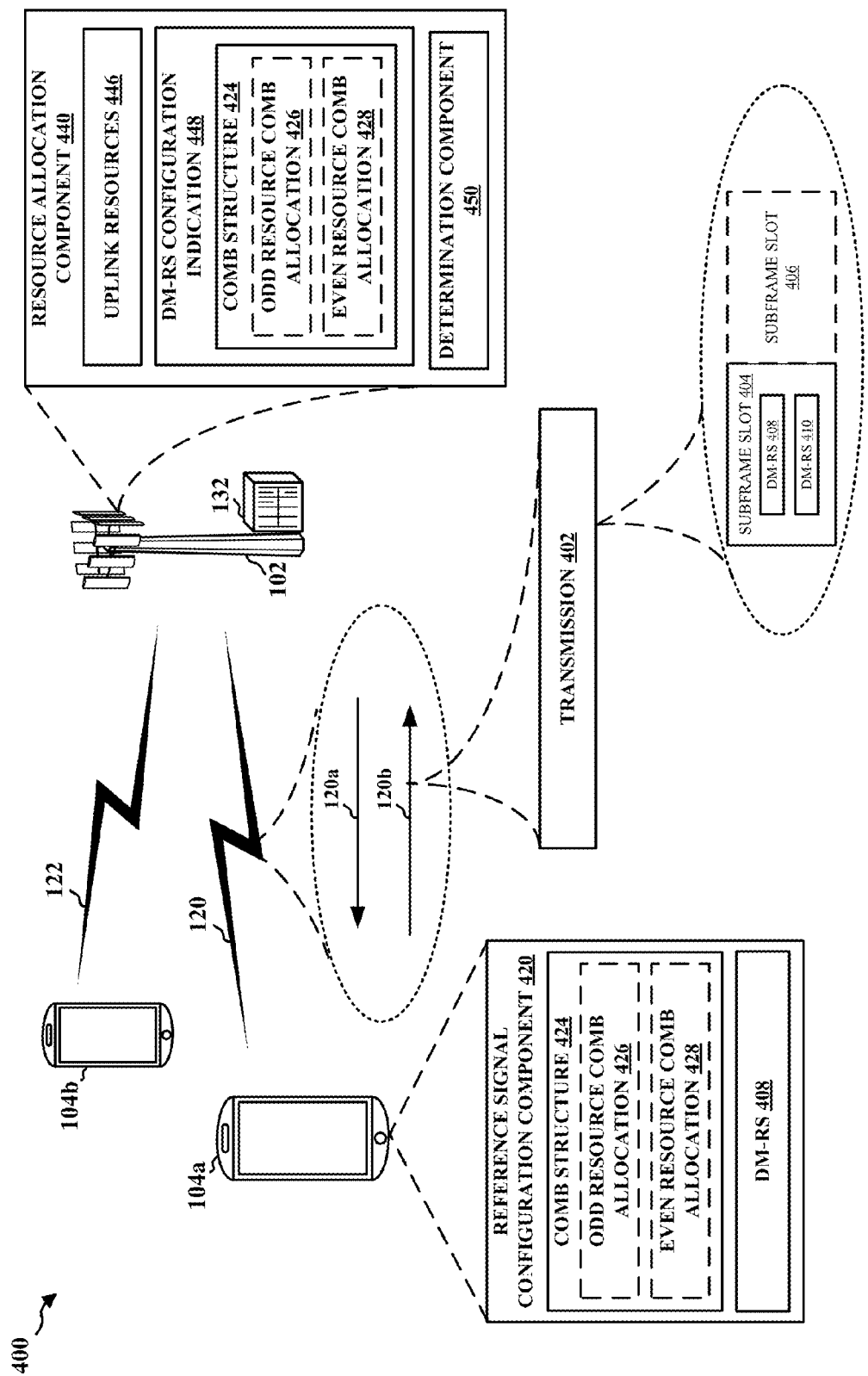
FIG. 5 is a schematic diagram of a wireless communication system including a UE having an aspect of a reference signal configuration component and a base station having an aspect of a resource allocation component in accordance with various aspects of the present disclosure.

Referring to FIG. 5, in an aspect, a wireless communications system 400 (which may be the same as or similar to wireless communications system and an access network 100 of FIG. 1) includes at least two UEs 104a and 104b in communication coverage of at least one base station 102. The base station 102 (collectively referred to as Evolved Universal Mobile Telecommunications System (UMTS) Terrestrial Radio Access Network (E-UTRAN)) may interface with an EPC (such as EPC 160 of FIG. 1) through backhaul links 132 (e.g., S1 interface). In an aspect, UEs 104a and 104b may include one or more processors (not shown) and, optionally, memory (not shown), that may operate in combination with reference signal configuration component 420 to configure transmission of DM-RS in either a single slot TTI with a comb structure or a dual slot TTI based on information received from base station 102. The wireless communications between UEs 104a and 104b and base station 102 may include signals transmitted by either the base station 102 or the UEs 104a and 104b via communication links 120 and 122, respectively. For example, with respect to the communication between UE 104a and base station 102, wireless communications may include one or more downlink channels 120a transmitted by base station 102 to UE 104, and one or more uplink channels 120b transmitted by UE 104 to base station 102. A similar structure may be utilized between UE 104b and base station 102. Although not shown, UE 104b may also include reference signal configuration component 420 for configuring transmission of DM-RS 410.

In an aspect, base station 102 includes resource allocation component 440, which may be configured to allocate resources to UEs 104a and 104b and transmit information indicating whether each UE is to transmit a respective DM-RS (e.g., DM-RS in the case of UE 104a) in a single slot TTI (e.g., subframe slot 404) having a comb structure or dual slot TTI. For instance, in some aspects where UE 104a and UE 104b communicate according to a slot based structure (e.g., 0.5 ms TTI), base station 102 may allocate a first set of uplink resources from the uplink resources 446 for MIMO communication to UE 104a and a second set of uplink resources from the uplink resources 446 for MIMO communication to UE 104b. In some aspects, the uplink resources 446 may be PUSCH/PUCCH resources.

Additionally, as part of or subsequent to the resource allocation, base station 102, and more particularly determination component 450 may determine whether UE 104a and UE 104b are non-legacy UEs in that non-legacy UEs communicate according to a single slot structure (e.g., 0.5 TTI). Further, determination component 450 may determine whether a portion of the allocated resources overlap in the frequency domain. For example, the first set of uplink resources and the second set of uplink resources may be allocated in one slot corresponding to a TTI of UE 104a and the UE 104b. As such, determination component 450 may determine whether at least a portion of the first set of uplink resources from the uplink resources 446 and a second set of uplink resources from the uplink resources 446 overlap.

Further, resource allocation component 440 may transmit information on communication links 120 and 122 indicating whether UE 104a and the UE 104b, respectively, are to transmit DM-RS with a comb structure in the one/single subframe slot 404 based on the allocation. Specifically, resource allocation component 440 may transmit information including DM-RS configuration indication 448 on communication links 120 and 122 indicating to both UE 104a and UE 104b to transmit DM-RS with a comb structure 424 in the one/single subframe slot 404 based on a determination that the first set of uplink resources and the second set of uplink resources have an overlapping portion of resources which includes an overlapping portion of PUSCH resources.

In some aspects, the comb structure 424 includes an odd resource comb allocation 426 or an even resource comb allocation 428. That is, in transmitting a DM-RS configuration indication 448 to each of UEs 104a and 104b, resource allocation component 440 may configure uplink transmission at the UEs such that orthogonality is preserved by assigning the allocated resources to one of an odd resource comb allocation 426 or an even resource comb allocation 428 at UE 104a, and another one of the odd resource comb allocation 426 or an even resource comb allocation 428 at UE 104b.

As such, resource allocation component 440 may indicate to UE 104a, via DM-RS configuration indication 448 to transmit DM-RS 408 according to a first comb structure corresponding to one of an odd resource comb allocation 426 or an even resource comb allocation 428 and indicate to UE 104b, via DM-RS configuration indication 448 to transmit DM-RS 410 according to a second comb structure corresponding to another one of the odd resource comb allocation 426 or the even resource comb allocation 428. That is, DM-RS configuration indication 448, which may indicate whether the first UE and the second UE are to transmit DM-RS with a comb structure, includes an assignment of the first comb structure to UE 104a associated with the first set of uplink resources and the second comb structure to second UE 104b associated with the second set of uplink resources.

In some aspects, use of each cyclic shift in each comb of the first comb structure and the second comb structure may provide orthogonality. Further, in some aspects, the first comb structure and the second comb structure have a configurable number of cyclic shifts (e.g., each comb structure having six cyclic shifts). Accordingly, UEs 104a and 104b may transmit a respective DM-RS on different alternating combs. In some aspects, the odd comb allocation and the even comb allocation may be non-overlapping in frequency.

Figure 7:
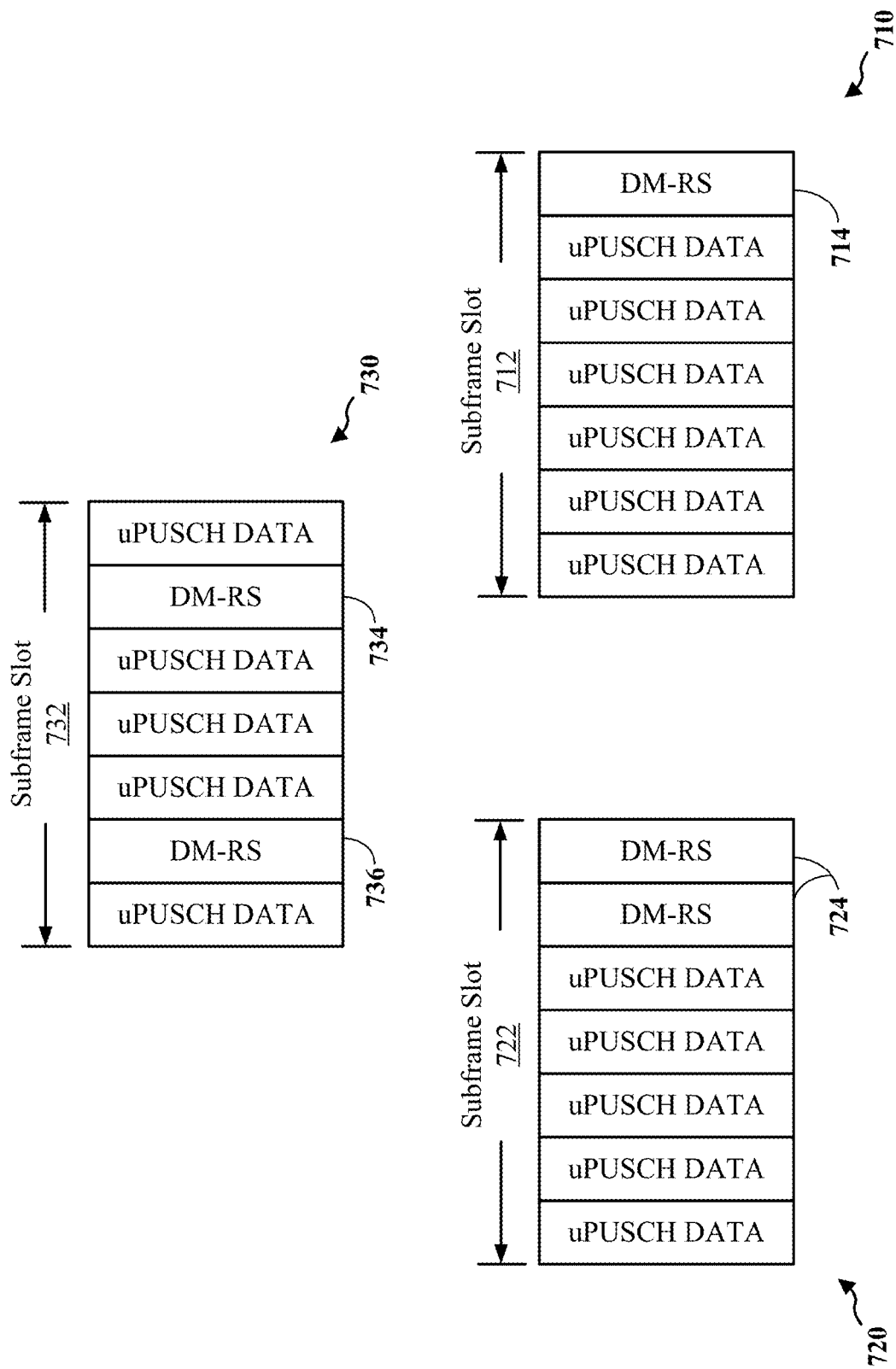
FIG. 7 is a diagram illustrating various aspects of a subframe slot format in accordance with various aspects of the present disclosure.

Further, in some aspects, base station 102 may transmit information indicating a slot format for the one subframe slot 404 in accordance with the aspects described herein with respect to FIG. 7. For example, the DM-RS configuration indication may further include or otherwise indicate a slot format of the one subframe slot 404 for DM-RS transmission by UE 104a. In some aspects, the slot format may include a DM-RS symbol at a first symbol of the slot. In some aspects, the slot format further includes two DM-RS symbols at the first and second symbols of the slot. In other aspects, the slot format includes two DM-RS symbols at symbols located at predefined locations within the slot, where the slot may include seven symbols.

In this aspect, UEs 104a and/or 104b may receive an allocation of resources from the uplink resources 446 and/or DM-RS configuration indication 448 on downlink channel 120a of communication link 120 from base station 102. Specifically, with respect to UE 104a, reference signal configuration component 420 may be configured to receive information in the form of DM-RS configuration indication 448 indicating whether UE 104a is to transmit DM-RS 408 with a comb structure in an allocated first set of uplink resources for MIMO communication. In some aspects, the first set of uplink resources may be in one subframe slot 404 corresponding to a TTI of UE 104a.

For example, reference signal configuration component 420 may configure DM-RS 408 according to comb structure 424 having one of an odd resource comb allocation 426 or even resource comb allocation 428. Similarly, UE 104b, which may also have received DM-RS configuration indication 448 indicating whether to transmit DM-RS 410 with a comb structure 424 in an allocated second set of uplink resources for MIMO communication, may also correspondingly configure DM-RS 410 according to the specified allocation of the comb structure 424. That is, the received information including DM-RS configuration indication indicates that the UE 104a is to transmit the DM-RS 408 with the comb structure 424 as the first set of uplink resources overlaps with a portion of a second set of uplink resources allocated to UE 104b.

Further, by assigning one of an odd resource comb allocation 426 or an even resource comb allocation 428 to UE 104a, and another one of the odd resource comb allocation 426 or the even resource comb allocation 428 to UE 104b, comb structure 424 may effectively interlace DM-RS 408 and DM-RS 410 during transmission to base station 102. Transmission 402 may include at least subframe slot 404 having DM-RS 408 interlaced with DM-RS 410 according to comb structure 424. As such, the odd resource comb allocation 426 and the even resource comb allocation 428 are non-overlapping in frequency. UE 104a and/or UE 104b may be configured to transmit a respective DM-RS based on the transmission configuration of the respective DM-RS by reference signal configuration component 420. In turn, base station 102, via a receiver, may be configured to receive DM-RS 408 of UE 104a interlaced with DM-RS 410 of UE 104b according to the comb structure in the one/single subframe slot 404.

In an aspect where UE 104a communicates according to a slot based TTI and UE 104b communicates according to a subframe based TTI, resource allocation component 440 may be configured to allocate a first set of uplink resources being in a first slot (e.g., subframe slot 404) corresponding to a first TTI and a second set of uplink resources being in a second slot (e.g., subframe slot 406) to a UE 104a. Additionally, resource allocation component 440 may be configured to allocate a third set of uplink resources being in the first slot (e.g., subframe slot 404) and the second slot (e.g., subframe slot 406) within the subframe (e.g., spanning across two slots) corresponding to a second TTI different from the first TTI to UE 104b. For example, UE 104a may transmit in both subframe slot 404 and subframe slot 406 and is partially overlaid with UE 104b, which communicates according to a subframe level.

Further, resource allocation component 440 may be configured to transmit to the UE 104a, information indicating whether to transmit in the second slot (e.g., subframe slot 406) a same DM-RS as the first slot (e.g., subframe slot 404) or to transmit in the second slot a negative of the DM-RS used in the first slot. The information may include an indication of an application of an OCC functionality to effectively maintain DM-RS orthogonality between a legacy UE and non-legacy UE across the subframe. As such, in this aspect, UE 104a, which communicates according to a slot-TTI structure, may transmit DM-RS 408 in the first and second slots (e.g., subframe slots 404 and 406), and the base station 102 may select an appropriate OCC that ensures that UE 104a has an orthogonal DM-RS 408 with UE 104b. As such, base station 102 can emulate the OCC functionality, but at the slot level.

Further, in such aspect, UE 104a may be configured to receive information in the form of a DM-RS configuration indication indicating whether UE 104a is to transmit a DM-RS in a single slot (e.g., subframe slot 404) or in two slots (e.g., both subframe slots 404 and 406) within a subframe (e.g., of 1 ms). In some aspects, the single slot corresponding to a TTI of UE 104a and associated with an allocated first set of uplink resources for MIMO communication. Further, UE 104a may transmit the DM-RS in either the single slot (e.g., according to the transmission structure of FIG. 5) or in the two slots (e.g., according to the transmission structure of FIG. 6) based on the received information. For example, the received information indicates that UE 104a is to transmit the DM-RS 408 in the two slots when the first set of uplink resources overlaps with a portion of a second set of uplink resources for MIMO communication allocated to UE 104b. In some aspects, the second set of uplink resources may be allocated on a subframe basis.

In addition, the first, second, and third set of resources may include PUSCH resources. In some aspects, subframe slot 404 and subframe slot 406 are different slots within a single subframe. For example, the transmission 402 may have a first subframe slot 404 and a second subframe slot 406. In some instances, at least one of subframe slot 404 and subframe slot 406 may have a single-slot TTI. Additionally, subframe slot 404 and subframe slot 406 may be located in a same subframe, or each of subframe slot 404 and subframe slot 406 may be located in a different subframe. In some instances, subframe slot 404 may precede in time subframe slot 406, or in other instances, subframe slot 406 may precede in time subframe slot 404. In another aspect, subframe slot 404 may comprise a set of symbols including one or more symbols in a slot of a first subframe and one or more symbols in a slot of a second subframe.

Figure 6A:
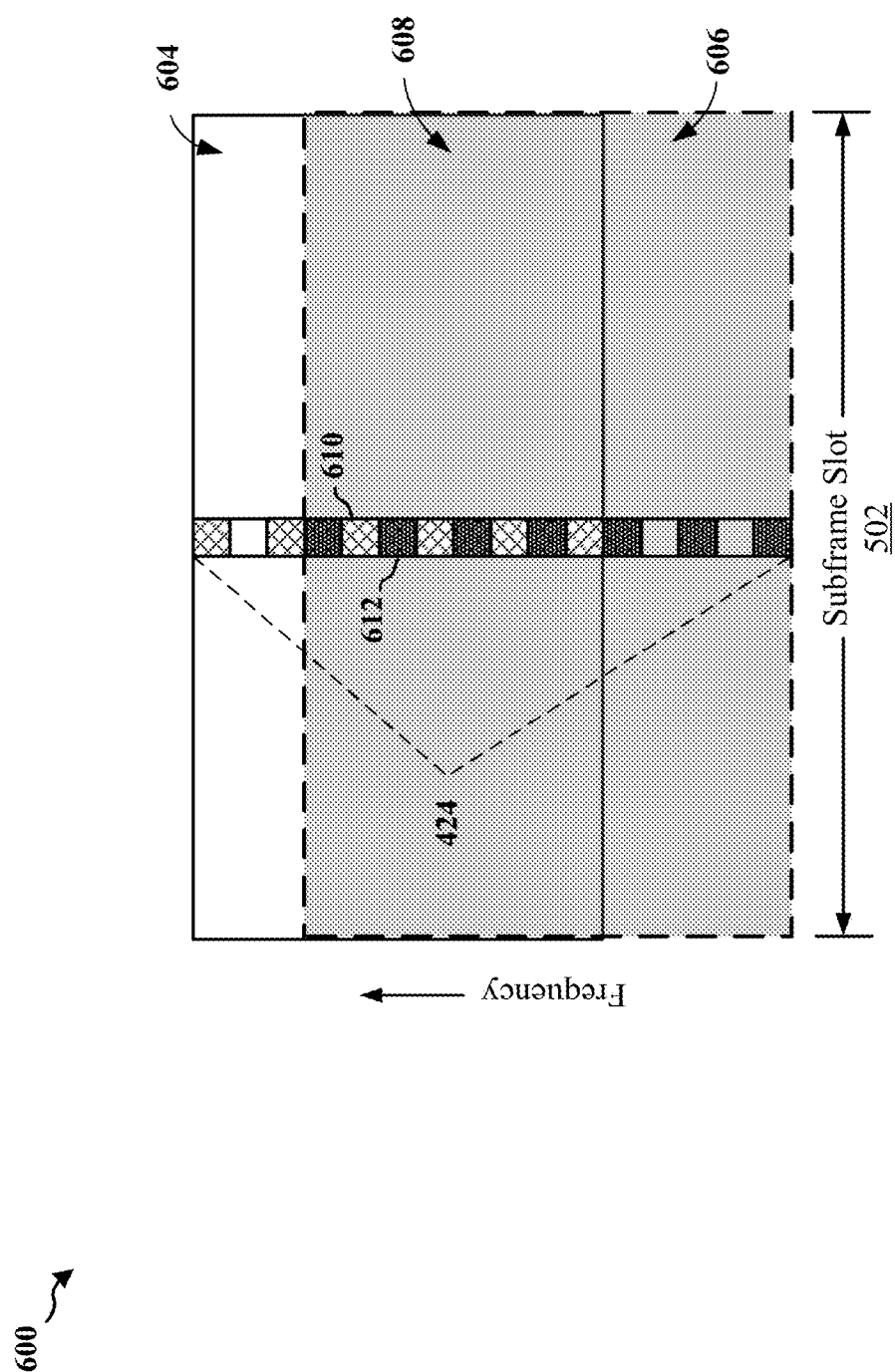
FIG. 6A is a diagram illustrating an aspect of an uplink subframe slot structure having a single slot-TTI in accordance with various aspects of the present disclosure.

FIG. 6A is a diagram illustrating a non-limiting aspect of an uplink subframe slot structure 500 having a single slot-TTI (spanning a single slot of the subframe, 0.5 ms TTI). For example, subframe slot 404 and/or 406 may take the form of subframe slot 502. Specifically, as illustrated, subframe slot 502 may include an interleaved or interlaced (decimated) structure of resource element blocks allocated to a first UE and a second UE each supporting MIMO communication. The interlaced resources may be constructed according to comb structure 424. For instance, a first set of uplink (e.g., PUSCH) resources 504 may be allocated to a first UE and a second set of uplink (e.g., PUSCH) resources 506 may be allocated to a second UE. In some aspects, the first set of uplink resources 504 and the second set of uplink resources 506 may include a partially overlapping region 508. In order to maintain orthogonality without the use of an OCC, the resource elements of each allocated set of uplink resources are to be constructed in a comb structure. In one example, the first set of uplink resources 504 allocated to the first UE may correspond to an even resource comb allocation 510 (e.g., subcarriers 0, 2, 4, 6, 8, and 10 of a slot), whereas the second set of uplink resources 506 allocated to the second UE may correspond to an odd resource comb allocation 512 (e.g., subcarriers 1, 3, 5, 7, 9, and 11 of a slot). In another example, the first set of uplink resources 504 allocated to the first UE may correspond to an odd resource comb allocation 512, whereas the second set of uplink resources 506 allocated to the second UE may correspond to an even resource comb allocation 510. As such, the uplink subframe slot structure 500 uses two non-overlapping combs to create orthogonality between uplink resources allocated to a first and second UE.

In a non-limiting aspect of a DM-RS transmission structure for PUSCH, the following table provides various DM-RS transmission configurations.

| Cyclic Shift Field in Uplink PDCCH grant | $n_{DMRS,\lambda}^{(2)}$ | | | | DMRS Structure | | | |
| --- | --- | --- | --- | --- | --- | --- | --- | --- |
| | $\lambda = 0$ | $\lambda = 1$ | $\lambda = 2$ | $\lambda = 3$ | $\lambda = 0$ | $\lambda = 1$ | $\lambda = 2$ | $\lambda = 3$ |
| 000 | 0 | 6 | 3 | 9 | Full DMRS | | | |
| 001 | 2 | 8 | 5 | 11 | Full DMRS | | | |
| 010 | 4 | 10 | 7 | 1 | Full DMRS | | | |
| 011 | 8 | 2 | 11 | 5 | Full DMRS | | | |
| 100 | 0 | 2 | 4 | 0 | Even Comb | Even Comb | Odd Comb | Odd Comb |
| 101 | 2 | 0 | 4 | 0 | Odd Comb | Odd Comb | Even Comb | Even Comb |
| 110 | 1 | 3 | 5 | 1 | Even Comb | Even Comb | Odd Comb | Odd Comb |
| 111 | 3 | 1 | 5 | 1 | Odd Comb | Odd Comb | Even Comb | Even Comb |

Where $n_{DMRS,\lambda}^{(2)}$ is the cyclic shift and is the layer number.

In one example, the above table demonstrates support for legacy use cases with full DM-RS as well as partially overlapping cases with interlaced DM-RS. For example, in one configuration, a single user with a four layer SU-MIMO with full DM-RS (first UE=000) may be supported. In another example, two users supporting MU-MIMO having less than or equal to two layers with the same PUSCH resource allocation and having full DM-RS (first UE=000, second UE=001) may be supported. In a further example, in order to maintain orthogonality between UE transmissions having partially overlapping allocated uplink resources in a single subframe slot, the first UE may be provided a cyclic shift field in uplink PDCCH grant of 100, and the second UE may be provided a cyclic shift field in uplink PDCCH grant of 101. The table above is a non-limiting example and different cyclic shifts may be used for the cyclic shift fields 000-111. Further, which cyclic shift fields correspond to the full DM-RS and which cyclic shift fields correspond to the comb structure also may vary.

Figure 6B:
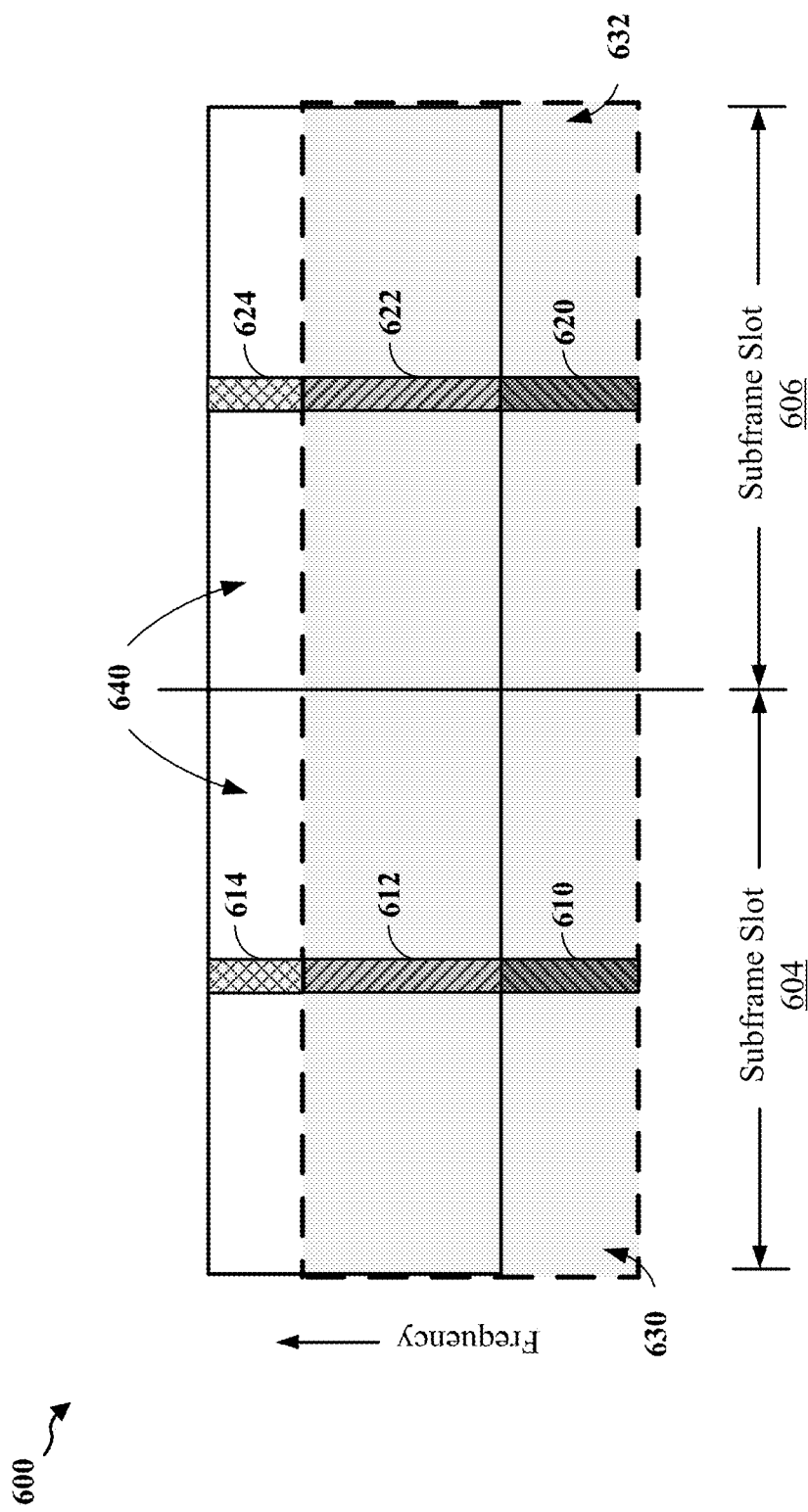
FIG. 6B is a diagram illustrating another aspect of an uplink subframe structure having two slot-TTIs in accordance with various aspects of the present disclosure.

FIG. 6B is a diagram illustrating another non-limiting aspect of an uplink subframe structure having two slot-TTIs. Specifically, FIG. 6 illustrates an example of a first non-legacy UE communicating according to a slot based structure (e.g., 0.5 ms) and a second legacy UE communicating according to a subframe structure (e.g., 1 ms). In such example, uplink resources may be allocated to the first UE and the second UE. In particular, the first UE may be allocated a first set of uplink resources 630 and a second set of uplink resources 632 in a first subframe slot 604 and a second subframe slot 606, respectively. On the other hand, second UE may be allocated with a third set of uplink resources 640 in a subframe (e.g., formed by first and second subframe slots 604 and 606, respectively, DM-RS being 612, 614, 622, and 624). As such, the first subframe slot 604 and the second subframe slot 606 may form a single subframe of 1 ms duration. As illustrated in FIG. 6, first UE may transmit DM-RS 610, 612 in first subframe slot 604 and, based on whether an indication received from a base station indicates such, may also transmit the same or negative of the DM-RS 620, 622 in the second subframe slot 606 to effectively emulate the OCC functionality, but at the slot level.

The base station receives the PUSCH/PUCCH in the first subframe slot 604 from the first UE, but refrains from decoding/demodulating the received PUSCH/PUCCH until receiving the PUSCH/PUCCH in the second subframe slot 606. Based on the DM-RS 610, 612, 620, and 622, the base station decodes/demodulates the PUSCH/PUCCH in the first subframe slot 604 and the second subframe slot 606. That is, for channel estimation in order to decode/demodulate the PUSCH/PUCCH in the first subframe slot 604 of a first TTI, the base station uses the DM-RS 610, 612 of the first subframe slot 604 of the first TTI and the DM-RS 620, 622 of the second subframe slot 606 of a second TTI. Further, for channel estimation in order to decode/demodulate the PUSCH/PUCCH in the second subframe slot 606 of the second TTI, the base station uses the DM-RS 620, 622 of the second subframe slot 606 of the second TTI and the DM-RS 610, 612 of the first subframe slot 604 of the first TTI.

FIG. 7 is a diagram illustrating various non-limiting aspects of a subframe slot format. Specifically, in aspects permitting separate frequency division multiplexing (FDM) allocations of legacy and non-legacy (e.g., slot based transmission) UEs, the slot based transmission structure may be adjusted. Each of the subframe slots may include seven symbols. In one example, slot structure 710 may include a DM-RS at a first symbol of subframe slot 712. In another example, slot structure 720 may include two DM-RS symbols 724 at a first symbol and a second symbol, respectively, of subframe slot 722. As such, slot structures 710 and 720 provide a front loaded pilot with one or two DM-RS symbols that provide for more efficient receiver design.

Additionally, slot structure 730 may include a first DM-RS symbols 734 and a second DM-RS symbol 736 positioned at predefined symbol locations within the subframe slot 732. For example, slot structure 730 may include DM-RS locations at symbols two and five. As such, providing more than one DM-RS symbol placed in pre-configured positions as well as two DM-RS symbols allows for greater slot configuration flexibility. In addition, MIMO communication then becomes a function of the configured DM-RS configuration. For example, for the slot structure 710, a comb structure for DM-RS including an odd/even resource comb structure may be used, whereas for slot structures 720 and 730, full DM-RS with OCC structure may be used.

Figure 8:
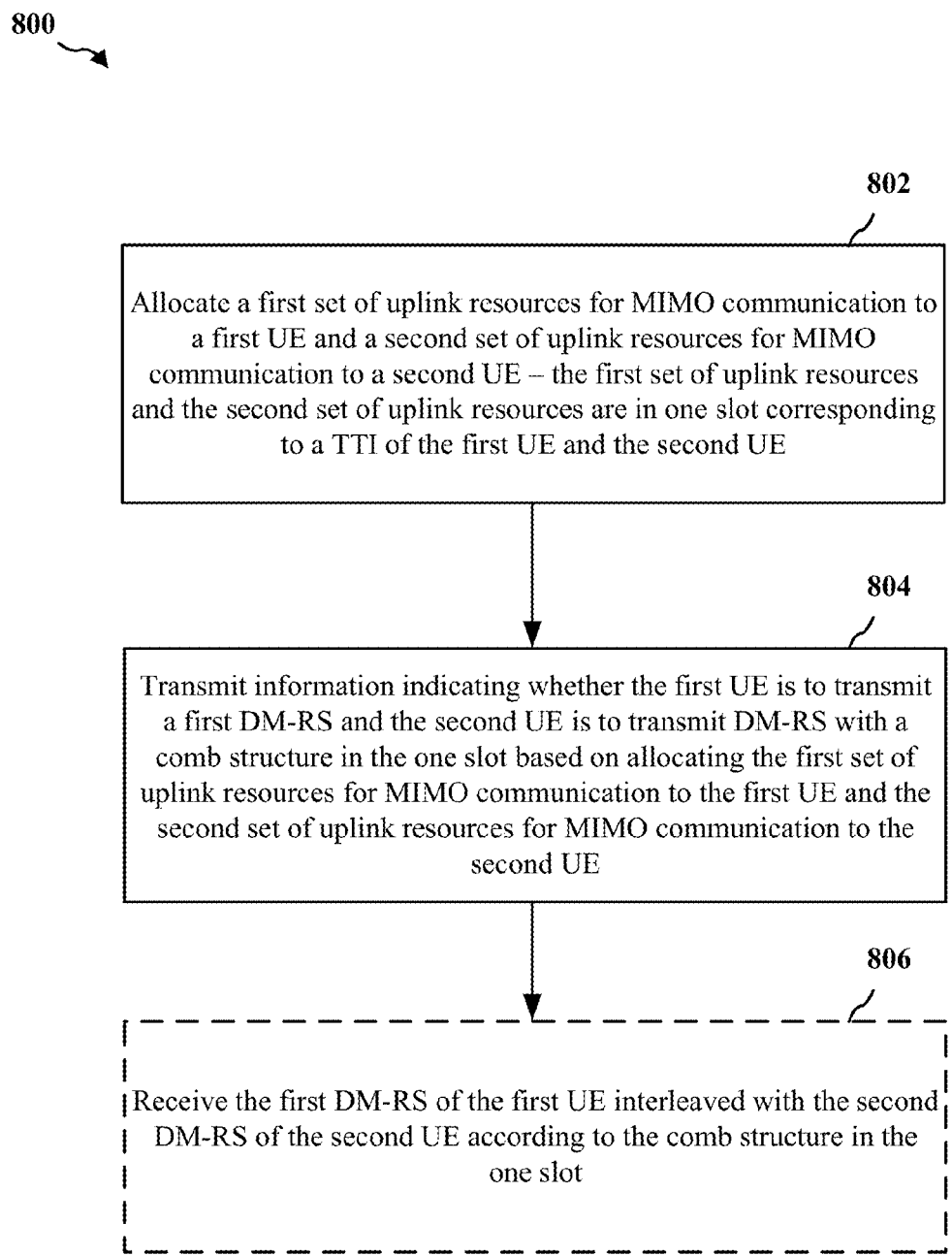
FIG. 8 is a flow diagram of an aspect of wireless communication at a base station according to a single slot DM-RS configuration, which may be executed by the resource allocation component FIG. 4.

Referring to FIG. 8, a base station such as base station 102 (FIGS. 1 and 4) may include one or more processors to perform an aspect of a method 800 for allocating resource and transmitting information indicating whether a UE is to transmit DM-RS in a single slot TTI having a comb structure. While, for purposes of simplicity of explanation, the method is shown and described as a series of acts, the method is not limited by the order of acts, as some acts may, in accordance with one or more embodiments, occur in different orders and/or concurrently with other acts from that shown and described herein. For example, the method could alternatively be represented as a series of interrelated states or events, such as in a state diagram. Moreover, not all illustrated acts may be required to implement the method in accordance with one or more features described herein.

In an aspect, at block 802, method 800 may allocate a first set of uplink resources for MIMO communication to a first UE and a second set of uplink resources for MIMO communication to a second UE. The first set of uplink resources and the second set of uplink resources may be in one slot corresponding to a TTI of the first UE and the second UE.

For example, in an aspect, base station 102 and/or resource allocation component 440 may allocate a first set of uplink resources (e.g., from uplink resources 446) for MIMO communication to a first UE (e.g., UE 104*a*) and a second set of uplink resources (e.g., from uplink resources 446) for MIMO communication to a second UE (e.g., UE 104*b*). In some aspects, the first set of uplink resources and the second set of uplink resources are in one slot (e.g., subframe slot 404) corresponding to a TTI of the first UE and the second UE.

At block 804, method 800 may transmit information indicating whether the first UE is to transmit a first DM-RS and the second UE is to transmit a second DM-RS with a comb structure in the one slot based on allocating the first set of uplink resources for MIMO communication to the first UE and the second set of uplink resources for MIMO communication to the second UE. For example, in an aspect, base station 102 and/or resource allocation component 440 may transmit information (e.g., DM-RS configuration indication 448) indicating whether the first UE (e.g., UE 104*a*) and the second UE (e.g., UE 104*b*) are to transmit DM-RS with a comb structure (e.g., comb structure 424) in the one slot (e.g., subframe slot 404) based on the allocation.

At block 806, method 800 may optionally receive a first DM-RS of the first UE interleaved with a second DM-RS of the second UE according to the comb structure in the one slot. For example, in an aspect, base station 102 and/or resource allocation component 440 may receive the DM-RS (e.g., DM-RS 408) of the first UE (e.g., subframe slot 404) interleaved with the DM-RS (e.g., DM-RS 410) of the second UE (e.g., UE 104*b*) according to the comb structure (e.g., comb structure 424) in the one slot (e.g., subframe slot 404).

Figure 9:
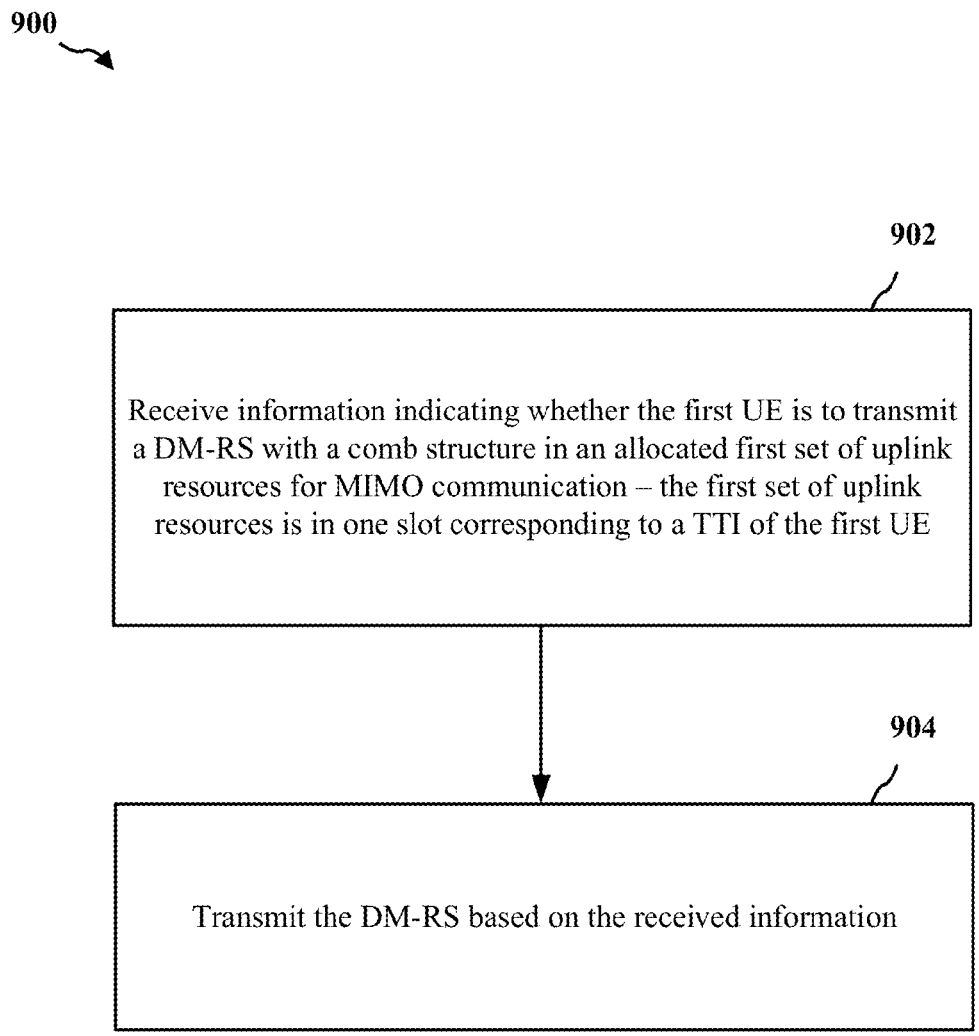
FIG. 9 is a flow diagram of an aspect of wireless communication at a UE according to a single slot DM-RS configuration, which may be executed by the reference signal configuration component of FIG. 4.

Referring to FIG. 9, a UE such as UE 104*a* or UE 104*b* (FIGS. 1 and 5) may include one or more processors to perform an aspect of a method 900 for configuring and transmitting a DM-RS to a base station. While, for purposes of simplicity of explanation, the method is shown and described as a series of acts, the method is not limited by the order of acts, as some acts may, in accordance with one or more embodiments, occur in different orders and/or concurrently with other acts from that shown and described herein. For example, the a method could alternatively be represented as a series of interrelated states or events, such as in a state diagram. Moreover, not all illustrated acts may be required to implement the method in accordance with one or more features described herein.

In an aspect, at block 902, method 900 may receive information indicating whether the first UE is to transmit a DM-RS with a comb structure in an allocated first set of uplink resources for MIMO communication. The first set of uplink resources is in one slot corresponding to a TTI of the first UE. For example, in an aspect, UE 104 and/or reference signal configuration component 420 may receive information indicating whether the first UE (e.g., UE 104*a*) is to transmit a DM-RS (e.g., DM-RS 408) with a comb structure (e.g., comb structure 424) in an allocated first set of uplink resources for MIMO communication, the first set of uplink resources being in one slot (e.g., subframe slot 404) corresponding to a TTI of the first UE.

Further, at block 904, method 900 may transmit the DM-RS based on the received information. For example, in an aspect, UE 104 and/or reference signal configuration component 420 may transmit the DM-RS (e.g., DM-RS 408) based on the received information.

Figure 10:
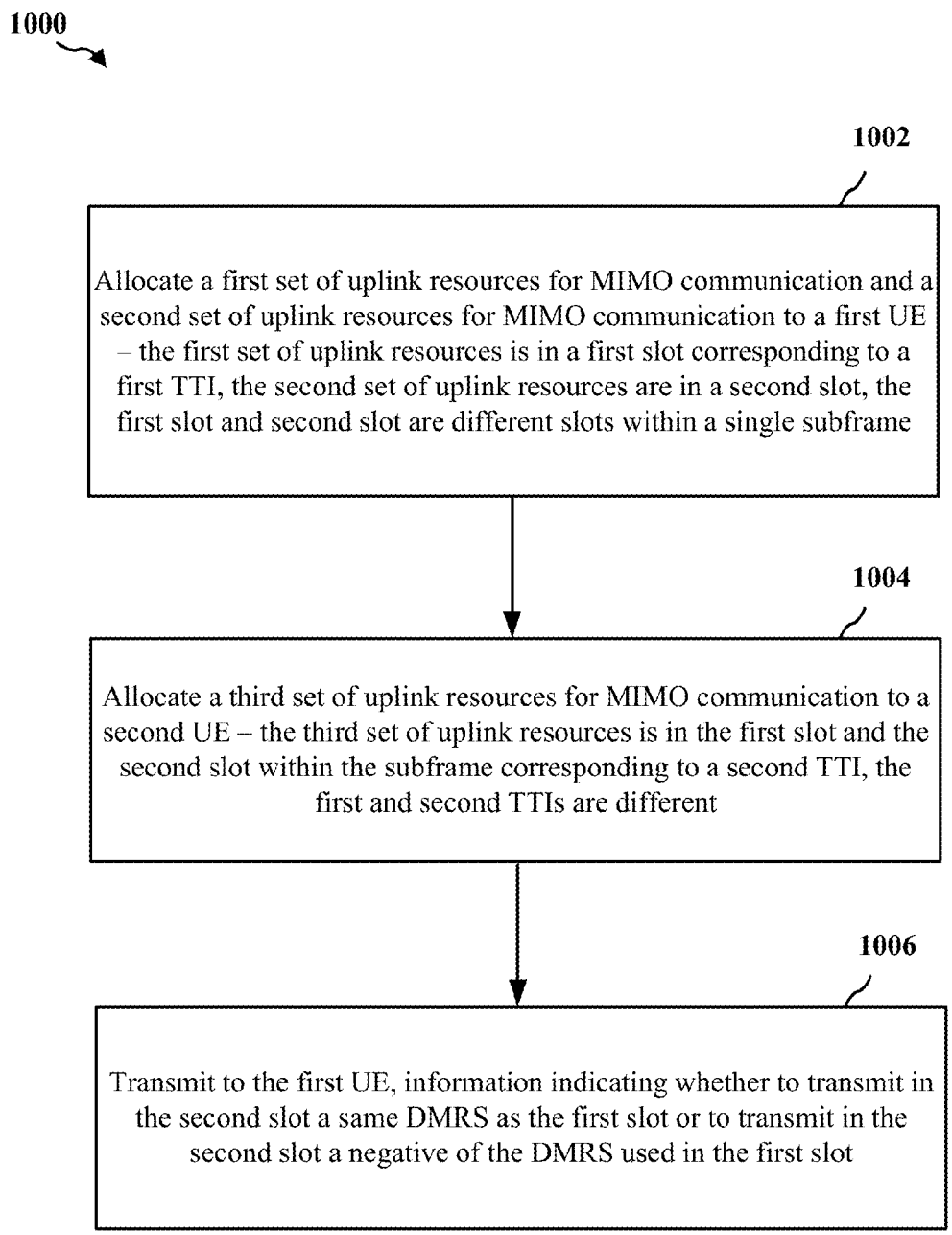
FIG. 10 is a flow diagram of an aspect of wireless communication at a base station according to a dual slot DM-RS configuration, which may be executed by the resource allocation component of FIG. 4.

Referring to FIG. 10, a base station such as base station 102 (FIGS. 1 and 5) may include one or more processors to perform an aspect of a method 1000 for allocating resources and transmitting information indicating whether a UE is to transmit DM-RS in a single slot TTI having a comb structure or dual slot TTI. While, for purposes of simplicity of explanation, the method is shown and described as a series of acts, the method is not limited by the order of acts, as some acts may, in accordance with one or more embodiments, occur in different orders and/or concurrently with other acts from that shown and described herein. For example, the method could alternatively be represented as a series of interrelated states or events, such as in a state diagram. Moreover, not all illustrated acts may be required to implement the method in accordance with one or more features described herein.

In an aspect, at block 1002, the method 1000 may allocate a first set of uplink resources for MIMO communication and a second set of uplink resources for MIMO communication to a first UE. The first set of uplink resources is in a first slot corresponding to a first TTI. The second set of uplink resources is in a second slot. The first slot and second slot are different slots within a single subframe. For example, in an aspect, base station 102 and/or resource allocation component 440 may allocate a first set of uplink resources for MIMO communication and a second set of uplink resources for MIMO communication to a first UE (e.g., UE 104*a*), the first set of uplink resources being in a first slot (e.g., subframe slot 404) corresponding to a first TTI, the second set of uplink resources being in a second slot (e.g., subframe slot 406), the first slot and second slot being different slots within a single subframe.

At block 1004, method 1000 may allocate a third set of uplink resources for MIMO communication to a second UE. The third set of uplink resources being in the first slot and the second slot within the subframe corresponding to a second TTI. The first and second TTIs are different. For example, in an aspect, base station 102 and/or resource allocation component 440 may allocate a third set of uplink resources for MIMO communication to a second UE (e.g., UE 104*b*), the third set of uplink resources being in the first slot (e.g., subframe slot 404) and the second slot (e.g., subframe slot 406) within the subframe corresponding to a second TTI, the first and second TTIs being different.

At block 1006, method 1000 may transmit to the first UE, information indicating whether to transmit in the second slot a same DM-RS as the first slot or to transmit in the second slot a negative of the DM-RS used in the first slot. For example, in an aspect, base station 102 and/or resource allocation component 440 may transmit to the first UE (e.g., UE 104*a*), information indicating whether to transmit in the second slot (e.g., subframe slot 406) a same DM-RS (e.g., DM-RS 408) as the first slot (e.g., subframe slot 404) or to transmit in the second slot a negative of the DM-RS used in the first slot.

Figure 11:
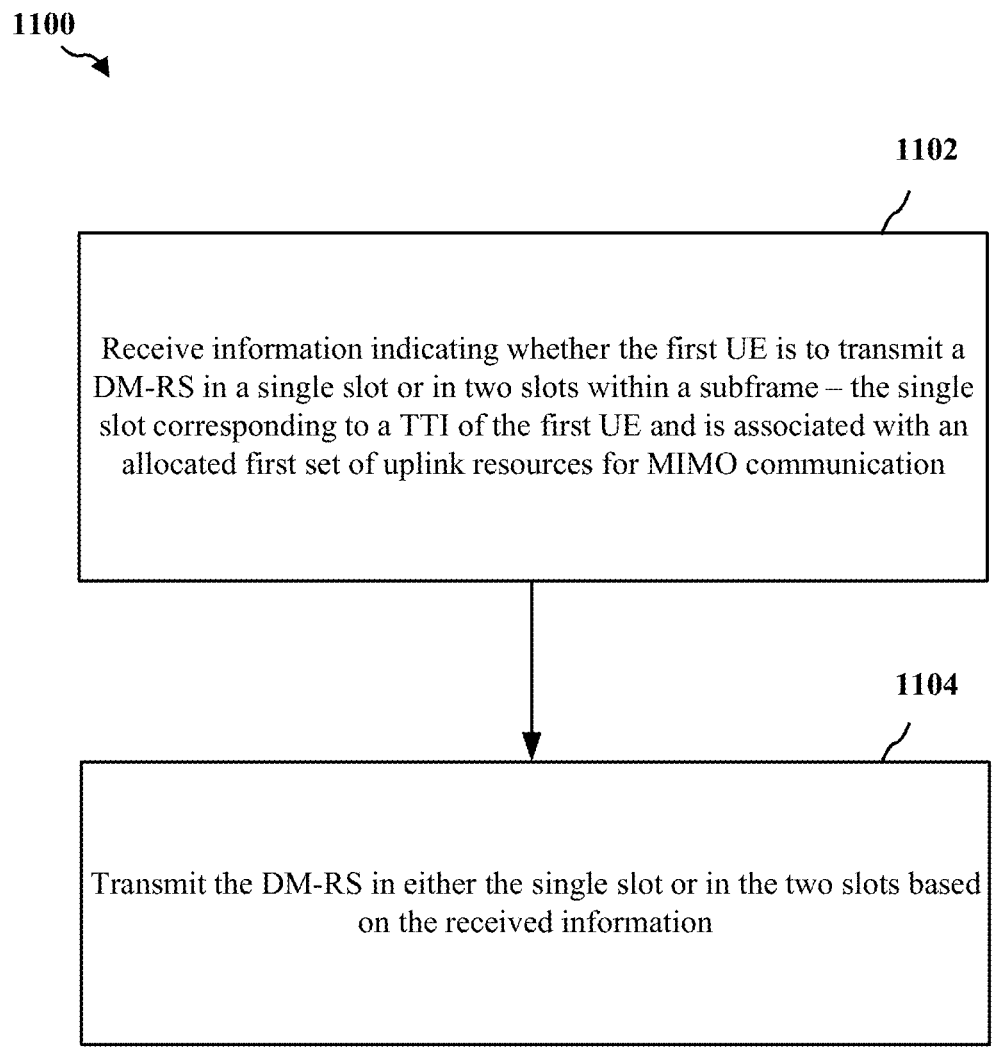
FIG. 11 is a flow diagram of an aspect of wireless communication at a UE according to a dual slot DM-RS configuration, which may be executed by the reference signal configuration component of FIG. 4.

Referring to FIG. 11, a UE such as UE 104*a* or UE 104*b* (FIGS. 1 and 5) may include one or more processors to perform an aspect of a method 1100 for configuring and transmitting DM-RS to a base station. While, for purposes of simplicity of explanation, the method is shown and described as a series of acts, the method is not limited by the order of acts, as some acts may, in accordance with one or more embodiments, occur in different orders and/or concurrently with other acts from that shown and described herein. For example, the method could alternatively be represented as a series of interrelated states or events, such as in a state diagram. Moreover, not all illustrated acts may be required to implement the method in accordance with one or more features described herein.

In an aspect, at block 1102, method 1100 may receive information indicating whether the first UE is to transmit a DM-RS in a single slot or in two slots within a subframe. The single slot corresponding to a TTI of the first UE and is associated with an allocated first set of uplink resources for MIMO communication. For example, in an aspect, UE 104 and/or reference signal configuration component 420 may receive information indicating whether the first UE (e.g., UE 104*a*) is to transmit a DM-RS (e.g., DM-RS 408) in a single slot (e.g., subframe slot 404) or in two slots (e.g., subframe slots 404 and 406) within a subframe, the single slot corresponding to a TTI of the first UE and being associated with an allocated first set of uplink resources for MIMO communication.

Figure 12:
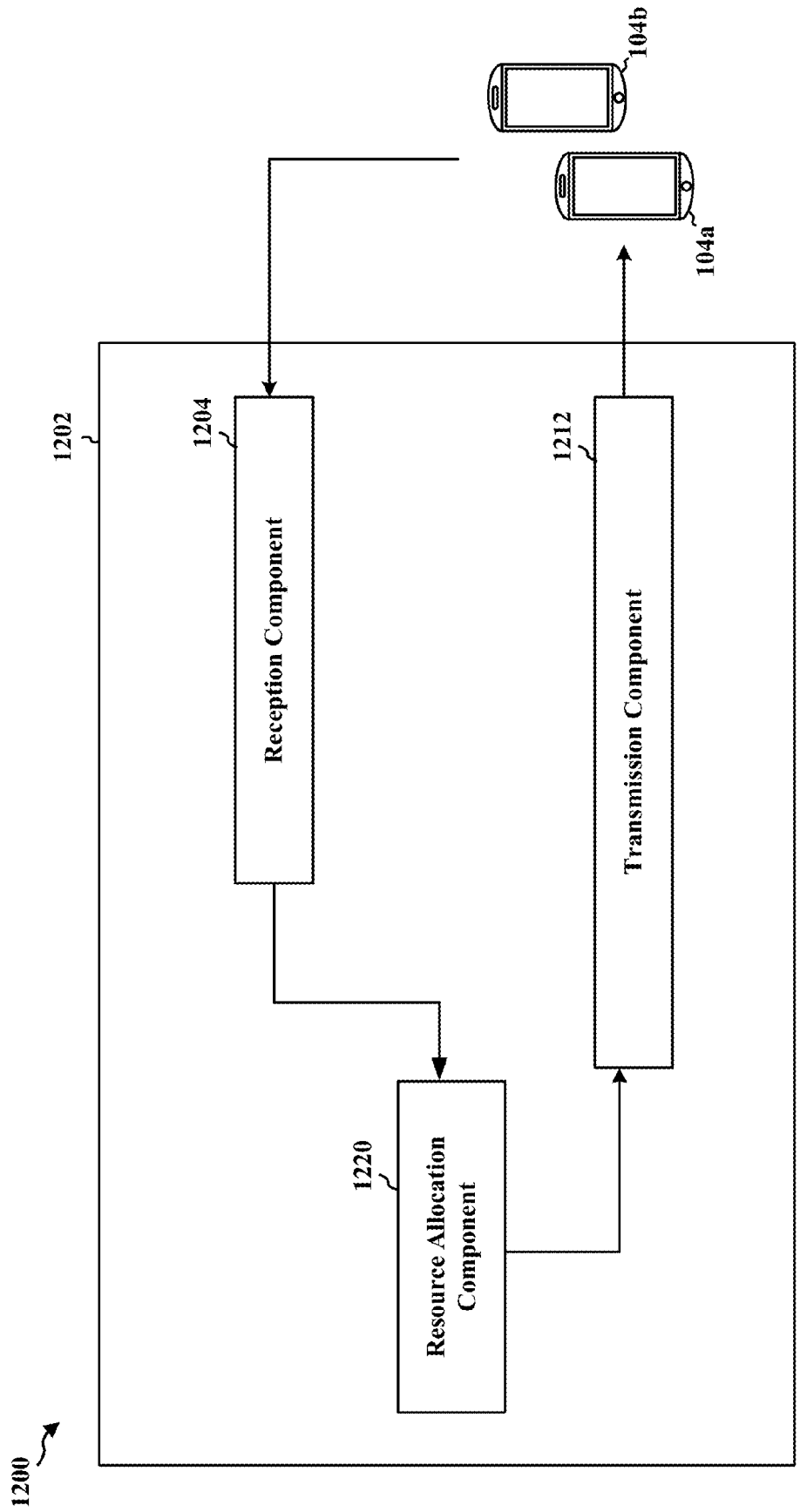
FIG. 12 is a conceptual data flow diagram illustrating the data flow between different means/components in an exemplary apparatus including a resource allocation component in accordance with various aspects of the present disclosure.

At block 1104, method 1100 may transmit the DM-RS in either the single slot or in the two slots based on the received information. For example, in an aspect, UE 104 and/or reference signal configuration component 420 may transmit the DM-RS (e.g., DM-RS 408) in either the single slot (e.g., subframe slot 404) or in the two slots (e.g., subframe slots 404 and 406) based on the received information FIG. 12 is a conceptual data flow diagram 1200 illustrating the data flow between different means/components in an exemplary apparatus 1202 that includes resource allocation component 1220, which may be the same as or similar to resource allocation component 440. The apparatus 1202 may be a base station, which may include base station 102 of FIGS. 1 and 4. The apparatus 1202 includes resource allocation component 440 that, in an aspect, allocates a first set of uplink resources for MIMO communication to a first UE and a second set of uplink resources for MIMO communication to a second UE, the first set of uplink resources and the second set of uplink resources being in one slot corresponding to a TTI of the first UE and the second UE. Further, in an aspect, resource allocation component 440 allocates a first set of uplink resources for MIMO communication and a second set of uplink resources for MIMO communication to a first UE, the first set of uplink resources being in a first slot corresponding to a first TTI, the second set of uplink resources being in a second slot, the first slot and second slot being different slots within a single subframe, and allocates a third set of uplink resources for MIMO communication to a second UE, the third set of uplink resources being in the first slot and the second slot within the subframe corresponding to a second TTI, the first and second TTIs being different. The apparatus 1202 further includes a transmission component 1212 that transmits one or more signals from apparatus 1202 to UE 104*a* and/or 104*b*. In an aspect, transmission component 1212 transmits information indicating whether the first UE (e.g., UE 104*a*) and the second UE (e.g., UE 104*b*) are to transmit demodulation reference signal (DM-RS) with a comb structure in the one slot based on the allocation. Further, in some aspects, transmission component 1212 transmits to the first UE (e.g., UE 104*a*), information indicating whether to transmit in the second slot a same DMRS as the first slot or to transmit in the second slot a negative of the DMRS used in the first slot. Further, apparatus 1202 includes reception component 1204 that receives a DM-RS of the first UE (e.g., UE 104*a*) interleaved with a DM-RS of a second UE (e.g., UE 104*b*) according to the comb structure in the one slot.

The apparatus may include additional components that perform each of the blocks of the algorithm in the aforementioned flowcharts of FIG. 12. As such, each block in the aforementioned flowcharts of FIG. 12 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

Figure 13:
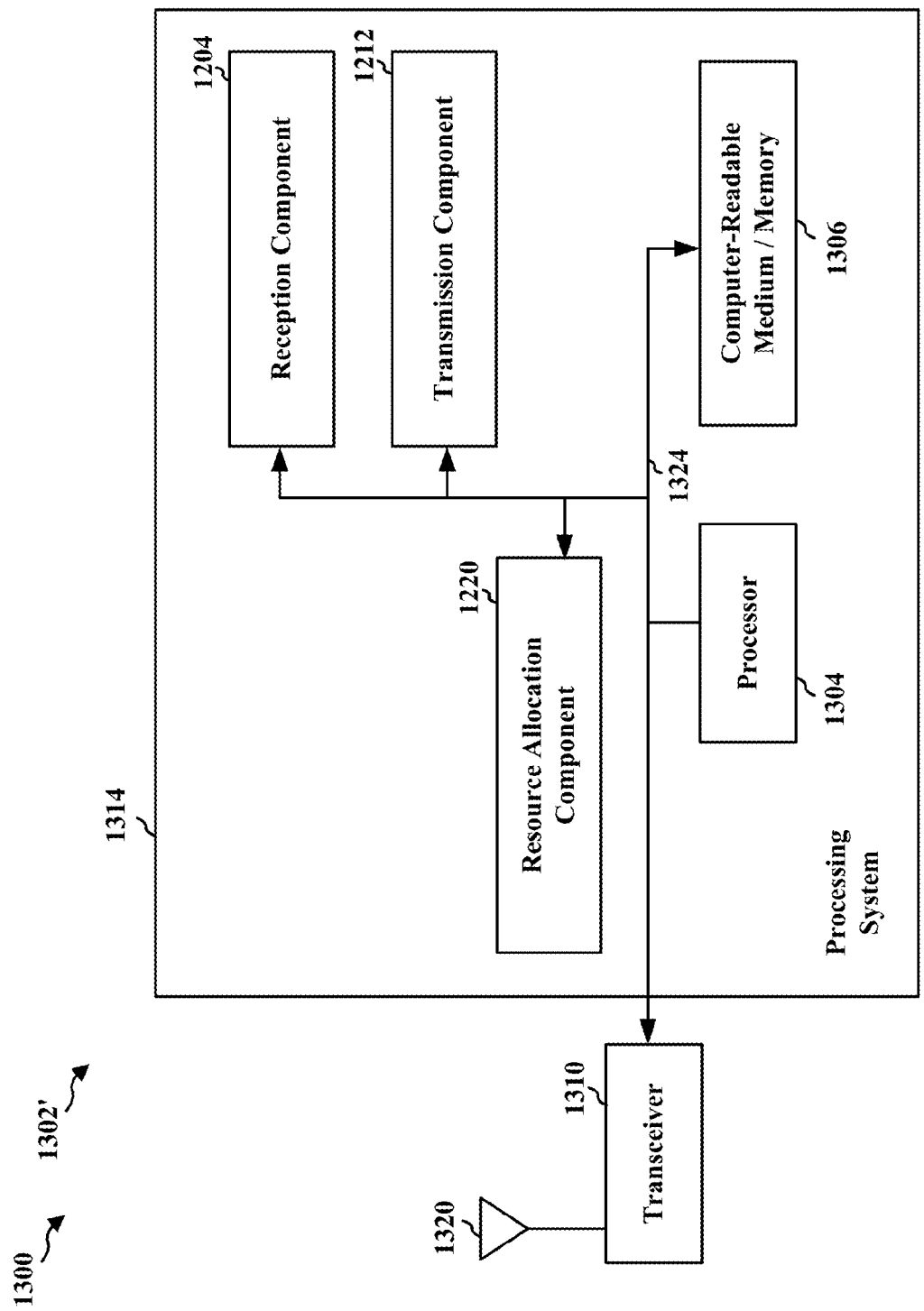
FIG. 13 is a diagram illustrating an example of a hardware implementation for an apparatus employing a processing system including a resource allocation component in accordance with various aspects of the present disclosure.

FIG. 13 is a diagram 1300 illustrating an example of a hardware implementation for an apparatus 1302' employing a processing system 1314 that includes resource allocation component 1220 (FIG. 12), which may be the same as or similar to resource allocation component 440. The processing system 1314 may be implemented with a bus architecture, represented generally by the bus 1324. The bus 1324 may include any number of interconnecting buses and bridges depending on the specific application of the processing system 1314 and the overall design constraints. The bus 1324 links together various circuits including one or more processors and/or hardware components, represented by the processor 1304, the components 1304, 1306, 1308, 1312, and 1220, and the computer-readable medium/memory 1306. The bus 1324 may also link various other circuits such as timing sources, peripherals, voltage regulators, and power management circuits, which are well known in the art, and therefore, will not be described any further.

The processing system 1314 may be coupled to a transceiver 1310. The transceiver 1310 is coupled to one or more antennas 1320. The transceiver 1310 provides a means for communicating with various other apparatus over a transmission medium. The transceiver 1310 receives a signal from the one or more antennas 1320, extracts information from the received signal, and provides the extracted information to the processing system 1314, specifically the reception component 1304. In addition, the transceiver 1310 receives information from the processing system 1314, specifically the transmission component 1312, and based on the received information, generates a signal to be applied to the one or more antennas 1320. The processing system 1314 includes a processor 1304 coupled to a computer-readable medium/memory 1306. The processor 1304 is responsible for general processing, including the execution of software stored on the computer-readable medium/memory 1306. The software, when executed by the processor 1304, causes the processing system 1314 to perform the various functions described supra for any particular apparatus. The computer-readable medium/memory 1306 may also be used for storing data that is manipulated by the processor 1304 when executing software. The processing system 1314 further includes at least one of the components 1220, 1304, 1306, 1308, and 1312. The components may be software components running in the processor 1304, resident/stored in the computer readable medium/memory 1306, one or more hardware components coupled to the processor 1304, or some combination thereof.

In one configuration, the apparatus 1302/1302' for wireless communication includes means for allocating a first set of uplink resources for MIMO communication to a first UE and a second set of uplink resources for MIMO communication to a second UE, the first set of uplink resources and the second set of uplink resources are in one slot corresponding to a TTI of the first UE and the second UE. The apparatus includes means for transmitting information indicating whether the first UE and the second UE are to transmit DM-RS with a comb structure in the one slot based on the allocation. Further, in another configuration, the apparatus 1302/1302' for wireless communication includes means for allocating a first set of uplink resources for MIMO communication and a second set of uplink resources for MIMO communication to a first UE, the first set of uplink resources are in a first slot corresponding to a first TTI, the second set of uplink resources are in a second slot, the first slot and second slot being different slots within a single subframe. The apparatus includes means for allocating a third set of uplink resources for MIMO communication to a second UE, the third set of uplink resources is in the first slot and the second slot within the subframe corresponding to a second TTI, the first and second TTIs are different. The apparatus includes means for transmitting to the first UE, information indicating whether to transmit in the second slot a same DMRS as the first slot or to transmit in the second slot a negative of the DMRS used in the first slot.

The aforementioned means may be one or more of the aforementioned components of the apparatus 1302 and/or the processing system 1314 of the apparatus 1302' configured to perform the functions recited by the aforementioned means. As described supra, the processing system 1314 may include the TX Processor 368, the RX Processor 356, and the controller/processor 359. As such, in one configuration, the aforementioned means may be the TX Processor 368, the RX Processor 356, and the controller/processor 359 configured to perform the functions recited by the aforementioned means.

Figure 14:
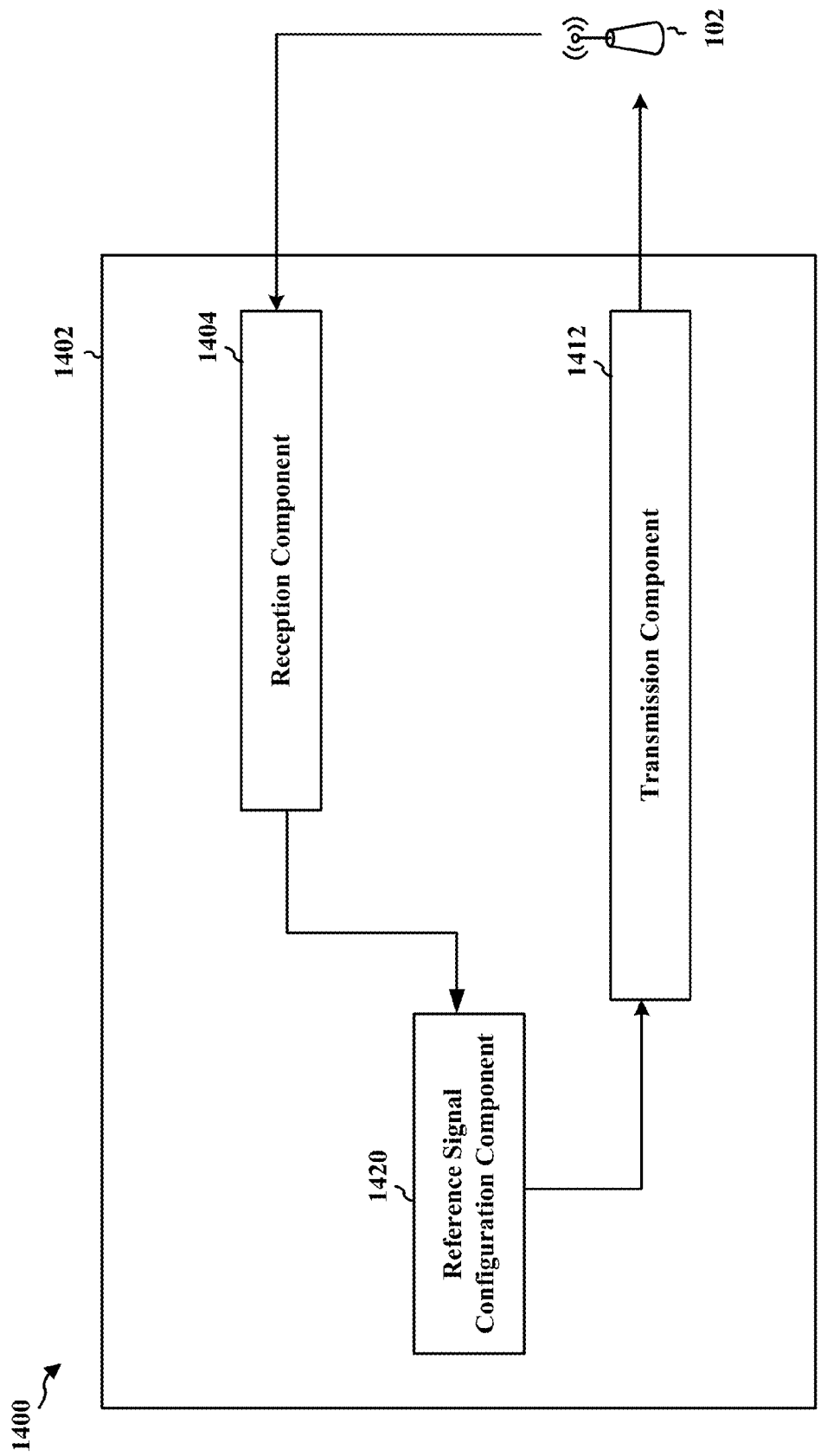
FIG. 14 is a conceptual data flow diagram illustrating the data flow between different means/components in an exemplary apparatus including a reference signal configuration component in accordance with various aspects of the present disclosure.

FIG. 14 is a conceptual data flow diagram 1400 illustrating the data flow between different means/components in an exemplary apparatus 1402 that includes reference signal configuration component 1420, which may be the same as or similar to reference signal configuration component 420. The apparatus 1402 may be a UE, which may include UE 104a or UE 104b of FIGS. 1 and 4. The apparatus 1402 includes reception component 1404 that, in an aspect, receives information indicating whether the first UE is to transmit a demodulation reference signal (DM-RS) with a comb structure in an allocated first set of uplink resources for MIMO communication, the first set of uplink resources being in one slot corresponding to a TTI of the first UE. In another aspect, reception component 1404 receives information indicating whether the first UE is to transmit a DM-RS in a single slot or in two slots within a subframe, the single slot corresponding to a TTI of the first UE and being associated with an allocated first set of uplink resources for MIMO communication. The apparatus 1402 includes reference signal configuration component 1420 that configures a DM-RS with a comb structure in an allocated first set of uplink resources for MIMO transmission. In an aspect, the apparatus 1402 further includes transmission component 1412 that transmits the DM-RS based on the received information. In another aspect, transmission component 1412 transmits the DM-RS in either the single slot or in the two slots based on the received information The apparatus may include additional components that perform each of the blocks of the algorithm in the aforementioned flowcharts of FIG. 14. As such, each block in the aforementioned flowcharts of FIG. 14 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

Figure 15:
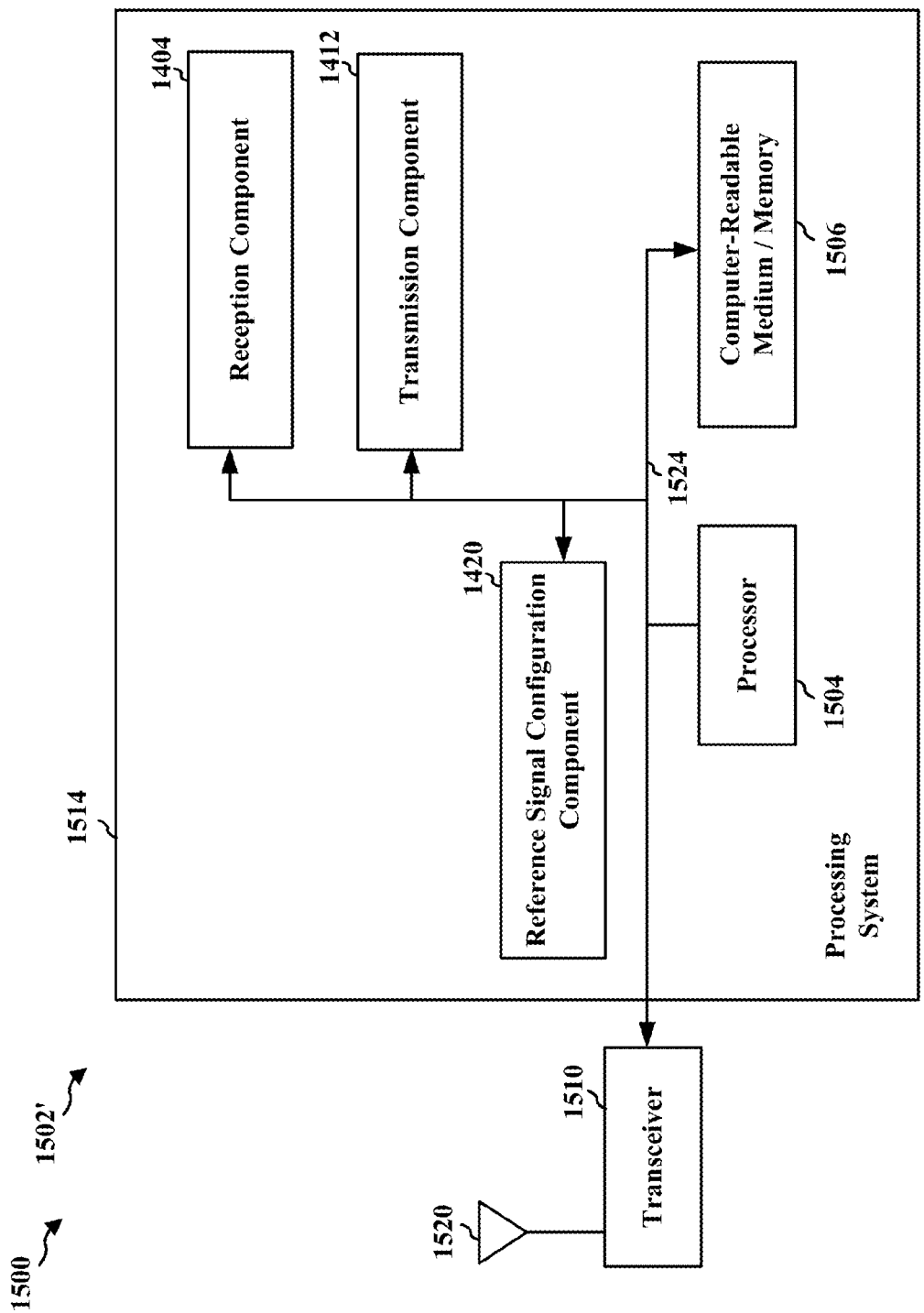
FIG. 15 is a diagram illustrating an example of a hardware implementation for an apparatus employing a processing system including a reference signal configuration component in accordance with various aspects of the present disclosure.

FIG. 15 is a diagram 1500 illustrating an example of a hardware implementation for an apparatus 1502' employing a processing system 1514 that includes reference signal configuration component 1420 (FIG. 14), which may be the same as or similar to reference signal configuration component 420. The processing system 1514 may be implemented with a bus architecture, represented generally by the bus 1524. The bus 1524 may include any number of interconnecting buses and bridges depending on the specific application of the processing system 1514 and the overall design constraints. The bus 1524 links together various circuits including one or more processors and/or hardware components, represented by the processor 1504, the components 1504, 1506, 1404, 1412, and 1520, and the computer-readable medium/memory 1506. The bus 1524 may also link various other circuits such as timing sources, peripherals, voltage regulators, and power management circuits, which are well known in the art, and therefore, will not be described any further.

The processing system 1514 may be coupled to a transceiver 1510. The transceiver 1510 is coupled to one or more antennas 1520. The transceiver 1510 provides a means for communicating with various other apparatus over a transmission medium. The transceiver 1510 receives a signal from the one or more antennas 1520, extracts information from the received signal, and provides the extracted information to the processing system 1514, specifically the reception component 1404. In addition, the transceiver 1510 receives information from the processing system 1514, specifically the transmission component 1512, and based on the received information, generates a signal to be applied to the one or more antennas 1520. The processing system 1514 includes a processor 1504 coupled to a computer-readable medium/memory 1506. The processor 1504 is responsible for general processing, including the execution of software stored on the computer-readable medium/memory 1506. The software, when executed by the processor 1504, causes the processing system 1514 to perform the various functions described supra for any particular apparatus. The computer-readable medium/memory 1506 may also be used for storing data that is manipulated by the processor 1304 when executing software. The processing system 1514 further includes at least one of the components 1404, 1412, 1420, 1504, and 1506. The components may be software components running in the processor 1504, resident/stored in the computer readable medium/memory 1506, one or more hardware components coupled to the processor 1504, or some combination thereof.

In one configuration, the apparatus 1502/1502' for wireless communication includes means for allocating a first set of uplink resources for MIMO communication to a first UE and a second set of uplink resources for MIMO communication to a second UE, the first set of uplink resources and the second set of uplink resources are in one slot corresponding to a TTI of the first UE and the second UE. The apparatus includes means for transmitting information indicating whether the first UE and the second UE are to transmit DM-RS with a comb structure in the one slot based on the allocation. Further, in another configuration, the apparatus 1502/1502' for wireless communication includes means for receiving information indicating whether the first UE is to transmit a DM-RS in a single slot or in two slots within a subframe, the single slot corresponding to a TTI of the first UE and is associated with an allocated first set of uplink resources for MIMO communication. The apparatus includes means for transmitting the DM-RS in either the single slot or in the two slots based on the received information.

The aforementioned means may be one or more of the aforementioned components of the apparatus 1502 and/or the processing system 1514 of the apparatus 1502' configured to perform the functions recited by the aforementioned means. As described supra, the processing system 1514 may include the TX Processor 368, the RX Processor 356, and the controller/processor 359. As such, in one configuration, the aforementioned means may be the TX Processor 368, the RX Processor 356, and the controller/processor 359 configured to perform the functions recited by the aforementioned means.

It is understood that the specific order or hierarchy of blocks in the processes/flowcharts disclosed is an illustration of exemplary approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

What is claimed is:

1. A method of wireless communication at a base station, comprising:
    allocating a first set of uplink resources for multi-input multi-output (MIMO) communication to a first user equipment (UE) and a second set of uplink resources for MIMO communication to a second UE, the first set of uplink resources and the second set of uplink resources being in one slot corresponding to a transmit time interval (TTI) of the first UE and the second UE; and
    transmitting information indicating whether the first UE is to transmit a first demodulation reference signal (DM-RS) and the second UE is to transmit a second DM-RS with a comb structure in the one slot based on allocating the first set of uplink resources for MIMO communication to the first UE and the second set of uplink resources for MIMO communication to the second UE;
    wherein the first set and second set of uplink resources to be used for the first UE and the second UE are interleaved with each other through use of the comb structure for the first DM-RS and the second DM-RS.

2. The method of claim 1, further comprising receiving the first DM-RS of the first UE interleaved with the second DM-RS of the second UE according to the comb structure in the one slot.

3. The method of claim 1, wherein the comb structure includes a first comb structure corresponding to a first one of an odd resource comb allocation or an even resource comb allocation and a second comb structure corresponding to a second one of the odd resource comb allocation or the even resource comb allocation, the first one of the odd resource comb allocation or the even resource comb allocation being non-overlapping in frequency and the second one of the odd resource comb allocation or the even resource comb allocation being non-overlapping in frequency.

4. The method of claim 3, wherein the information indicating whether the first UE is to transmit the first DM-RS and the second UE is to transmit the second DM-RS with the first comb structure or the second comb structure, respectively, includes an assignment of the first comb structure to the first UE associated with the first set of uplink resources and the second comb structure to the second UE associated with the second set of uplink resources.

5. The method of claim 3, wherein each cyclic shift in each comb of the first comb structure and the second comb structure are orthogonal.

6. The method of claim 3, wherein the first comb structure and the second comb structure have a configurable number of cyclic shifts.

7. The method of claim 1, wherein the information further indicates a slot format of the one slot for DM-RS transmission.

8. The method of claim 7, wherein the slot format includes a DM-RS symbol at a first symbol of the one slot.

9. The method of claim 7, wherein the slot format further includes two DM-RS symbols at a first symbol and second a symbol of the one slot.

10. The method of claim 7, wherein the slot format includes two DM-RS symbols at symbols located at predefined locations within the one slot, wherein the one slot includes seven symbols.

11. The method of claim 1, wherein the first set of uplink resources and the second set of uplink resources have an overlapping portion of resources which includes an overlapping portion of physical uplink shared channel (PUSCH) resources.

12. A method of wireless communication at a first user equipment (UE), comprising:
    receiving information indicating whether the first UE is to transmit a demodulation reference signal (DM-RS) with a comb structure in an allocated first set of uplink resources for multi-input multi-output (MIMO) communication, the first set of uplink resources being in one slot corresponding to a transmit time interval (TTI) of the first UE, wherein the received information indicates that the first UE is to transmit the DM-RS with the comb structure when the first set of uplink resources overlaps with a portion of a second set of uplink resources for MIMO communication allocated to a second UE; and transmitting the DM-RS based on the received information.

13. The method of claim 12, wherein the comb structure in the allocated first set of uplink resources includes a first comb structure corresponding to one of an odd resource comb allocation or an even resource comb allocation, the odd resource comb allocation and the even resource comb allocation being non-overlapping in frequency, and
wherein the received information indicates that the first UE is to transmit DM-RS according to one of the odd resource comb allocation or the even resource comb allocation.

14. The method of claim 13, wherein transmitting the DM-RS includes transmitting the DM-RS according to one of the odd resource comb allocation or the even resource comb allocation.

15. The method of claim 12, wherein the information further indicates a slot format of the one slot for DM-RS transmission.

16. The method of claim 15, wherein the slot format includes a DM-RS symbol at a first symbol of the one slot.

17. The method of claim 15, wherein the slot format further includes two DM-RS symbols at the first and second symbols of the one slot.

18. The method of claim 15, wherein the slot format includes two DM-RS symbols at symbols located at predefined locations within the one slot, wherein the one slot including seven symbols.

19. An apparatus for wireless communication at a base station, comprising:
a memory; and
at least one processor coupled to the memory and configured to:
allocate a first set of uplink resources for multi-input multi-output (MIMO) communication to a first user equipment (UE) and a second set of uplink resources for MIMO communication to a second UE, the first set of uplink resources and the second set of uplink resources being in one slot corresponding to a transmit time interval (TTI) of the first UE and the second UE; and
transmit information indicating whether the first UE is to transmit a first demodulation reference signal (DM-RS) and the second UE is to transmit a second DM-RS with a comb structure in the one slot based on allocating the first set of uplink resources for MIMO communication to the first UE and the second set of uplink resources for MIMO communication to the second UE;
wherein the first set and second set of uplink resources to be used for the first UE and the second UE are interleaved with each other through use of the comb structure for the first DM-RS and the second DM-RS.

20. The apparatus of claim 19, wherein the at least one processor is further configured to receive the first DM-RS of the first UE interleaved with the second DM-RS of the second UE according to the comb structure in the one slot.

21. The apparatus of claim 19, wherein the comb structure includes a first comb structure corresponding to a first one of an odd resource comb allocation or an even resource comb allocation and a second comb structure corresponding to a second one of the odd resource comb allocation or the even resource comb allocation, the first one of the odd resource comb allocation or the even resource comb allocation being non-overlapping in frequency and the second one of the odd resource comb allocation or the even resource comb allocation being non-overlapping in frequency.

22. The apparatus of claim 21, wherein the information indicating whether the first UE is to transmit the first DM-RS and the second UE is to transmit the second DM-RS with the first comb structure or the second comb structure, respectively, includes an assignment of the first comb structure to the first UE associated with the first set of uplink resources and the second comb structure to the second UE associated with the second set of uplink resources.

23. An apparatus of wireless communication at a first user equipment (UE), comprising:
a memory; and
at least one processor coupled to the memory and configured to:
receive information indicating whether the first UE is to transmit a demodulation reference signal (DM-RS) with a comb structure in an allocated first set of uplink resources for multi-input multi-output (MIMO) communication, the first set of uplink resources being in one slot corresponding to a transmit time interval (TTI) of the first UE, wherein the received information indicates that the first UE is to transmit the DM-RS with the comb structure when the first set of uplink resources overlaps with a portion of a second set of uplink resources for MIMO communication allocated to a second UE; and
transmit the DM-RS based on the received information.

24. The apparatus of claim 23, wherein the comb structure in the allocated first set of uplink resources includes a first comb structure corresponding to one of an odd resource comb allocation or an even resource comb allocation, the odd resource comb allocation and the even resource comb allocation being non-overlapping in frequency, and
wherein the received information indicates that the first UE is to transmit DM-RS according to one of the odd resource comb allocation or the even resource comb allocation.

25. The apparatus of claim 24, wherein to transmit the DM-RS, the at least one processor is further configured to transmit the DM-RS according to one of the odd resource comb allocation or the even resource comb allocation.

26. The apparatus of claim 23, wherein the information further indicates a slot format of the one slot for DM-RS transmission.

* * * * *